US012501210B2

(12) United States Patent
Vilkamo et al.

(10) Patent No.: US 12,501,210 B2
(45) Date of Patent: Dec. 16, 2025

(54) WIND NOISE REDUCTION IN PARAMETRIC AUDIO

(71) Applicant: Nokia Technologies Oy, Espoo (FI)

(72) Inventors: Juha Vilkamo, Helsinki (FI); Jorma Makinen, Tampere (FI); Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 192 days.

(21) Appl. No.: 17/435,085

(22) PCT Filed: Feb. 21, 2020

(86) PCT No.: PCT/FI2020/050110
§ 371 (c)(1),
(2) Date: Aug. 31, 2021

(87) PCT Pub. No.: WO2020/178475
PCT Pub. Date: Sep. 10, 2020

(65) Prior Publication Data

US 2022/0141581 A1 May 5, 2022

(30) Foreign Application Priority Data

Mar. 1, 2019 (GB) ..................................... 1902812

(51) Int. Cl.
*H04R 3/00* (2006.01)
*H04R 1/40* (2006.01)
*H04R 29/00* (2006.01)

(52) U.S. Cl.
CPC ............ *H04R 3/005* (2013.01); *H04R 1/406* (2013.01); *H04R 29/005* (2013.01); *H04R 2410/01* (2013.01); *H04R 2410/07* (2013.01)

(58) Field of Classification Search
CPC ...... H04R 3/005; H04R 1/406; H04R 29/005; H04R 2410/01; H04R 2410/07
See application file for complete search history.

(56) References Cited

U.S. PATENT DOCUMENTS 9,460,727 B1 10/2016 Jing et al.
2010/0254541 A1* 10/2010 Hayakawa .......... G10L 21/0208 381/71.1

(Continued)

FOREIGN PATENT DOCUMENTS

CN 103986995 A 8/2014
CN 107533843 A 1/2018

(Continued)

OTHER PUBLICATIONS

Thompson, Jeffrey, et al., "Direct-Diffuse Decomposition of Multichanel Signals Using a System of Pairwise Correlations", Audio Engineering Society, Convention Paper 8807, Oct. 2012, 15 pages.

(Continued)

*Primary Examiner* — Daniel R Sellers
(74) *Attorney, Agent, or Firm* — McCarter & English, LLP

(57) ABSTRACT

An apparatus including circuitry configured to: obtain at least two audio signals from at least two microphones, wherein the at least two audio signals at least in part includes noise which is substantially incoherent between the at least two audio signals; estimate values associated with the noise (Continued)

within the at least two audio signals; process at least one of the at least two audio signals based on the values associated with the noise; and obtain spatial metadata associated with the at least two audio signals for rendering at least one of the at least two audio signals.

20 Claims, 14 Drawing Sheets

(56) References Cited

U.S. PATENT DOCUMENTS

| | | | | |
|---|---|---|---|---|
| 2012/0163622 | A1* | 6/2012 | Karthik | H04R 3/005<br>381/94.1 |
| 2012/0253798 | A1 | 10/2012 | Walters et al. | 704/226 |
| 2014/0219474 | A1* | 8/2014 | Feldt | H04R 27/00<br>381/98 |
| 2015/0213811 | A1* | 7/2015 | Elko | H04R 3/005<br>381/92 |
| 2017/0208407 | A1* | 7/2017 | Sapozhnykov | H04R 29/004 |
| 2017/0365255 | A1* | 12/2017 | Kupryjanow | G10L 25/21 |
| 2018/0098174 | A1* | 4/2018 | Goodwin | H04R 1/32 |
| 2020/0068309 | A1* | 2/2020 | Vilkamo | H04R 5/027 |
| 2021/0176579 | A1 | 6/2021 | Laitinen et al. | |
| 2021/0337339 | A1 | 10/2021 | Vilkamo et al. | 7/303 |
| 2021/0377685 | A1 | 12/2021 | Laitinen et al. | |
| 2022/0060824 | A1* | 2/2022 | Virolainen | H04R 3/005 |

FOREIGN PATENT DOCUMENTS

| | | | |
|---|---|---|---|
| CN | 109215677 | A | 1/2019 |
| WO | WO 2016/123572 | A1 | 8/2016 |
| WO | WO 2018/234624 | A1 | 12/2018 |

OTHER PUBLICATIONS

Laitinen, Mikko-Ville, and Ville Pulkki. "Binaural reproduction for directional audio coding." In Applications of Signal Processing to Audio and Acoustics, 2009. WASPAA'09. IEEE Workshop on, pp. 337-340. IEEE, Dec. 2009.

Vilkamo, Juha, Tapio Lokki, and Ville Pulkki. "Directional audio coding: Virtual microphone-based synthesis and subjective evaluation." Journal of the Audio Engineering Society 57, No. 9 (2009): 709-724.

Vilkamo, Juha, and Ville Pulkki. "Minimization of decorrelator artifacts in directional audio coding by covariance domain rendering." Journal of the Audio Engineering Society 61, No. 9 (Sep. 2013): 637-646.

* cited by examiner

1201
Microphone array input
1203
1204
Forward filter bank
1205
1206
T/F audio
Spatial analyser
1209
Spatial metadata
1210
Spatially sharp beamformer
1221
Wind-robust beamformer
1223
WNR appliance determiner
1211
1222
1224
Selector
1225
WNR appliance information
1212
1226
Post-filter
1227
T/F focus audio
1228
Inverse filter bank
1229
Focus audio
1230

WIND NOISE REDUCTION IN PARAMETRIC AUDIO

CROSS REFERENCE TO RELATED APPLICATION

This patent application is a U.S. National Stage application of International Patent Application Number PCT/FI2020/050110 filed Feb. 21, 2020, which is hereby incorporated by reference in its entirety, and claims priority to GB 1902812.5 filed Mar. 1, 2019.

FIELD

The present application relates to apparatus and methods for wind noise reduction in parametric audio capture and rendering.

BACKGROUND

Wind noise is problematic in mobile device recorded videos. There have been suggested various methods and apparatus to attempt to overcome this wind noise.

One approach for preventing wind noise is to physically shield the microphone. This shield can be formed from foam, fur or similar materials however these require significant space and thus can be too large for use in mobile devices.

An alternate approach is to use two or more microphones and adaptive signal processing. Wind noise disturbances vary rapidly as a function of time, frequency range and location. The amount of wind noise can be approximated from the energies and cross-correlations of the microphone signals.

Known signal processing techniques to suppress wind noise from multi-microphone input are:

- suppression by use of adaptive gain factors. When wind is present within a microphone signal, the gain/energy of the microphone signal is reduced so that the noise is attenuated;
- microphone signal combining. Microphone signals can be combined to emphasize the coherent component (external sound) with respect to incoherent noise (wind-generated or otherwise incoherent noise);
- microphone signal selection. When some of the microphone signals are distorted due to wind, microphone signals that are less affected by the wind noise are selected as the wind processed output.

Such signal processing is typically best performed on a frequency band by band basis. Some other noises, such as handling noise, can be similar to wind noise, and thus can be removed with similar procedures as wind noise.

A further alternative and more complex approach for wind noise removal is to utilize a trained deep learning network to retrieve a non-windy sound based on the windy sound.

The present invention also considers the WNR in context of parametric audio capture in general and parametric spatial audio capture in particular, from microphone arrays.

Spatial audio capture is known. Traditional spatial audio capture uses high-end microphone arrays such as spherical multi-microphone arrays (e.g. 32 microphones on a sphere), or microphone arrays with prominently directional microphones (e.g. four cardioid microphones arrangement), or large-spaced microphones (e.g. a set of microphones more than a meter apart).

Parametric spatial audio capture techniques have been developed to provide good quality spatial audio signals without the requirements for such high-end microphone arrays. Parametric audio capture is an approach where a set of parameters are estimated from the microphone array signals, and these parameters are then utilized in controlling the signal processing applied to the microphone array signals.

SUMMARY

There is provided according to a first aspect an apparatus comprising means configured to: obtain at least two audio signals from at least two microphones, wherein the at least two audio signals at least in part comprise noise which is substantially incoherent between the at least two audio signals; estimate values associated with the noise within the at least two audio signals; process at least one of the at least two audio signals based on the values associated with the noise; and obtain spatial metadata associated with the at least two audio signals for rendering at least one of the at least two audio signals.

The means configured to process at least one of the at least two audio signals may be configured to: determine weights to apply to at least one of the at least two audio signals; and apply the weights to the at least one of the at least two audio signals to suppress the noise.

The means configured to process at least one of the at least two audio signals may be configured to select at least one of the at least two audio signals based on the values associated with the noise so to suppress the noise.

The means configured to select at least one of the at least two audio signals may be configured to select a single best audio signal.

The means configured to process at least one of the at least two audio signals may be configured to generate a weighted combination of a selection of the at least two audio signals based on the values associated with the noise so to suppress the noise.

The means configured to generate a weighted combination of the selection of the at least two audio signals may be configured to generate a single audio signal from the weighed combination.

The values associated with the noise may be at least one of: energy values associated with the noise; values based on energy values associated with the noise; values related to the proportions of the noise within the at least two audio signals; values related to the proportions of the non-noise signal components within the at least two audio signals; and values related to the energy or amplitude of the non-noise signal components within the at least two audio signals.

The means may be further configured to process at least one of the at least two audio signals to be rendered, the means being configured to process the at least one of the at least two audio signals based on the spatial metadata.

The means configured to process at least one of the at least two audio signals to be rendered may be configured to generate at least two spatial metadata based processed audio signals, and the means configured to process the at least one of the at least two audio signals may be configured to process at least one of the at least two spatial metadata based processed audio signals.

The means configured to process the at least one of the at least two audio signals may be configured to generate at least two noise based processed audio signals, and the means configured to process the at least two audio signals to be rendered may be configured to process at least one of the at least two noise based processed audio signals.

The means configured to process the at least one of the at least two audio signals to be rendered may be further based on or affected by the means configured to process the at least one of the at least two audio signals.

The means configured to process at least one of the at least two audio signals to be rendered may be configured to: generate at least two processed audio signals to be rendered based on the spatial metadata; generate at least two decorrelated audio signals based on the at least two processed audio signals; and control a mix of the at least two processed audio signals and the at least two decorrelated audio signals to generate at least two audio signals to be output based on the means configured to process the at least one of the at least two audio signals based on the values associated with the noise.

The means configured to process at least one of the at least two audio signals to be rendered may be configured to: modify the spatial metadata based on the means configured to process the at least one of the at least two audio signals based on the values associated with the noise; and generate at least two processed audio signals to be rendered based on the modified spatial metadata.

The means configured to process at least one of the at least two audio signals to be rendered may be configured to: generate at least two beamformers; apply the at least two beamformers to the at least two audio signals to generate at least two beamformed versions of the at least two audio signals; select one of the at least two beamformed versions of the at least two audio signals based on the values associated with the noise.

The means configured to process at least one of the at least two audio signals and the means configured to process at least one of the at least two audio signals to be rendered may be a combined processing operation.

The noise may be at least one of: wind noise; mechanical component noise; electrical component noise; device handling noise; and noise that is substantially incoherent between the microphones.

According to a second aspect there is provided an apparatus comprising means configured to: obtain at least two processed audio signals, wherein the at least two processed audio signals have been processed from at least two audio signals from at least two microphones, and the at least two processed audio signals have been processed based on in part values associated with noise which is substantially incoherent between the at least two audio signals; obtain at least one processing indicator associated with the processing; obtain spatial metadata associated with the at least two audio signals for rendering at least one of the at least two audio signals; and process at least one of the at least two processed audio signals to be rendered, the means being configured to process the at least one of the at least two processed audio signals to be rendered based on the spatial metadata and the processing indicator.

The means configured to process at least one of the at least two audio signals to be rendered may be configured to: generate at least two processed audio signals to be rendered based on the spatial metadata; generate at least two decorrelated audio signals based on the at least two processed audio signals; and control a mix of the at least two processed audio signals and the at least two decorrelated audio signals to generate at least two audio signals to be output based on the means configured to process the at least one of the at least two audio signals based on the at least one processing indicator associated with the processing.

The means configured to process at least one of the at least two audio signals to be rendered may be configured to: modify the spatial metadata based on the at least one processing indicator associated with the processing; and generate at least two processed audio signals to be rendered based on the modified spatial metadata.

The means configured to process the at least one of the at least two audio signals to be rendered is configured to: generate at least two beamformers; apply the at least two beamformers to the at least two audio signals to generate beamformed versions of the at least two audio signals; select one of the at least two beamformed versions of the at least two audio signals based the on at least one processing indicator associated with the processing.

The noise may be at least one of: wind noise; mechanical component noise; electrical component noise; device handling noise; and noise that is substantially incoherent between the microphones. According to a third aspect there is provided a method comprising: obtaining at least two audio signals from at least two microphones, wherein the at least two audio signals at least in part comprise noise which is substantially incoherent between the at least two audio signals; estimating values associated with the noise within the at least two audio signals; processing at least one of the at least two audio signals based on the values associated with the noise; and obtaining spatial metadata associated with the at least two audio signals for rendering at least one of the at least two audio signals.

Processing at least one of the at least two audio signals may comprise: determining weights to apply to at least one of the at least two audio signals; and applying the weights to the at least one of the at least two audio signals to suppress the noise.

Processing at least one of the at least two audio signals may comprise selecting at least one of the at least two audio signals based on the values associated with the noise so to suppress the noise.

Selecting at least one of the at least two audio signals may comprise selecting a single best audio signal.

Processing at least one of the at least two audio signals may comprise generating a weighted combination of a selection of the at least two audio signals based on the values associated with the noise so to suppress the noise.

Generating a weighted combination of the selection of the at least two audio signals may comprise generating a single audio signal from the weighed combination.

The values associated with the noise may be at least one of: energy values associated with the noise; values based on energy values associated with the noise; values related to the proportions of the noise within the at least two audio signals; values related to the proportions of the non-noise signal components within the at least two audio signals; and values related to the energy or amplitude of the non-noise signal components within the at least two audio signals.

The method may further comprise processing at least one of the at least two audio signals to be rendered, wherein processing the at least one of the at least two audio signals may be based on the spatial metadata.

Processing at least one of the at least two audio signals to be rendered may comprise generating at least two spatial metadata based processed audio signals, and processing the at least one of the at least two audio signals may comprise processing at least one of the at least two spatial metadata based processed audio signals.

Processing the at least one of the at least two audio signals may comprise generating at least two noise based processed audio signals, and processing the at least two audio signals to be rendered may comprise processing at least one of the at least two noise based processed audio signals.

Processing the at least one of the at least two audio signals to be rendered may be further based on or affected by the processing of the at least one of the at least two audio signals.

Processing at least one of the at least two audio signals to be rendered may comprise: generating at least two processed audio signals to be rendered based on the spatial metadata; generating at least two decorrelated audio signals based on the at least two processed audio signals; and controlling a mix of the at least two processed audio signals and the at least two decorrelated audio signals to generate at least two audio signals to be output based on the processing of the at least one of the at least two audio signals based on the values associated with the noise.

Processing at least one of the at least two audio signals to be rendered may comprise: modifying the spatial metadata based on the processing the at least one of the at least two audio signals based on the values associated with the noise; and generating at least two processed audio signals to be rendered based on the modified spatial metadata.

Processing the at least one of the at least two audio signals to be rendered may comprise: generating at least two beamformers; applying the at least two beamformers to the at least two audio signals to generate at least two beamformed versions of the at least two audio signals; selecting one of the at least two beamformed versions of the at least two audio signals based on the values associated with the noise.

Processing at least one of the at least two audio signals and processing at least one of the at least two audio signals to be rendered may be a combined processing operation.

The noise may be at least one of: wind noise; mechanical component noise; electrical component noise; device handling noise; and noise that is substantially incoherent between the microphones.

According to a fourth aspect there is provided a method comprising: obtaining at least two processed audio signals, wherein the at least two processed audio signals have been processed from at least two audio signals from at least two microphones, and the at least two processed audio signals have been processed based on in part values associated with noise which is substantially incoherent between the at least two audio signals; obtaining at least one processing indicator associated with the processing; obtaining spatial metadata associated with the at least two audio signals for rendering at least one of the at least two audio signals; and processing at least one of the at least two processed audio signals to be rendered, the method further comprising processing the at least one of the at least two processed audio signals to be rendered based on the spatial metadata and the processing indicator.

Processing at least one of the at least two audio signals to be rendered may comprise: generating at least two processed audio signals to be rendered based on the spatial metadata; generating at least two decorrelated audio signals based on the at least two processed audio signals; and controlling a mix of the at least two processed audio signals and the at least two decorrelated audio signals to generate at least two audio signals to be output based on the processing of the at least one of the at least two audio signals based on the at least one processing indicator associated with the processing.

Processing at least one of the at least two audio signals to be rendered may comprise: modifying the spatial metadata based on the at least one processing indicator associated with the processing; and generating at least two processed audio signals to be rendered based on the modified spatial metadata.

Processing the at least one of the at least two audio signals to be rendered may comprise: generating at least two beamformers; applying the at least two beamformers to the at least two audio signals to generate beamformed versions of the at least two audio signals; selecting one of the at least two beamformed versions of the at least two audio signals based the on at least one processing indicator associated with the processing.

The noise may be at least one of: wind noise; mechanical component noise; electrical component noise; device handling noise; and noise that is substantially incoherent between the microphones.

According to a fifth aspect there is provided an apparatus comprising at least one processor and at least one memory including a computer program code, the at least one memory and the computer program code configured to, with the at least one processor, cause the apparatus at least to: obtain at least two audio signals from at least two microphones, wherein the at least two audio signals at least in part comprise noise which is substantially incoherent between the at least two audio signals; estimate values associated with the noise within the at least two audio signals; process at least one of the at least two audio signals based on the values associated with the noise; and obtain spatial metadata associated with the at least two audio signals for rendering at least one of the at least two audio signals.

The apparatus caused to process at least one of the at least two audio signals may be caused to: determine weights to apply to at least one of the at least two audio signals; and apply the weights to the at least one of the at least two audio signals to suppress the noise.

The apparatus caused to process at least one of the at least two audio signals may be caused to select at least one of the at least two audio signals based on the values associated with the noise so to suppress the noise.

The apparatus caused to select at least one of the at least two audio signals may be configured to select a single best audio signal.

The apparatus caused to process at least one of the at least two audio signals may be caused to generate a weighted combination of a selection of the at least two audio signals based on the values associated with the noise so to suppress the noise.

The apparatus caused to generate a weighted combination of the selection of the at least two audio signals may be caused to generate a single audio signal from the weighed combination.

The values associated with the noise may be at least one of: energy values associated with the noise; values based on energy values associated with the noise; values related to the proportions of the noise within the at least two audio signals; values related to the proportions of the non-noise signal components within the at least two audio signals; and values related to the energy or amplitude of the non-noise signal components within the at least two audio signals.

The apparatus may be further caused to process at least one of the at least two audio signals to be rendered, the apparatus caused to process at least one of the at least two audio signals to be rendered may be caused to process the at least one of the at least two audio signals based on the spatial metadata.

The apparatus caused to process at least one of the at least two audio signals to be rendered may be caused to generate at least two spatial metadata based processed audio signals, and the apparatus caused to process the at least one of the at least two audio signals may be caused to process at least one of the at least two spatial metadata based processed audio signals.

The apparatus caused to process the at least one of the at least two audio signals may be caused to generate at least two noise based processed audio signals, and the apparatus caused to process the at least two audio signals to be rendered may be caused to process at least one of the at least two noise based processed audio signals.

The apparatus caused to process the at least one of the at least two audio signals to be rendered may be further based on or affected by the processing of the at least one of the at least two audio signals.

The apparatus caused to process at least one of the at least two audio signals to be rendered may be caused to: generate at least two processed audio signals to be rendered based on the spatial metadata; generate at least two decorrelated audio signals based on the at least two processed audio signals; and control a mix of the at least two processed audio signals and the at least two decorrelated audio signals to generate at least two audio signals to be output based on the processing the at least one of the at least two audio signals based on the values associated with the noise.

The apparatus caused to process at least one of the at least two audio signals to be rendered may be caused to: modify the spatial metadata based on the processing of the at least one of the at least two audio signals based on the values associated with the noise; and generate at least two processed audio signals to be rendered based on the modified spatial metadata.

The apparatus caused to process at least one of the at least two audio signals to be rendered may be caused to: generate at least two beamformers; apply the at least two beamformers to the at least two audio signals to generate at least two beamformed versions of the at least two audio signals; select one of the at least two beamformed versions of the at least two audio signals based on the values associated with the noise.

The apparatus caused to process at least one of the at least two audio signals and process at least one of the at least two audio signals to be rendered may be a combined process.

The noise may be at least one of: wind noise; mechanical component noise; electrical component noise; device handling noise; and noise that is substantially incoherent between the microphones.

According to a sixth aspect there is provided an apparatus comprising at least one processor and at least one memory including a computer program code, the at least one memory and the computer program code configured to, with the at least one processor, cause the apparatus at least to: obtain at least two processed audio signals, wherein the at least two processed audio signals have been processed from at least two audio signals from at least two microphones, and the at least two processed audio signals have been processed based on in part values associated with noise which is substantially incoherent between the at least two audio signals; obtain at least one processing indicator associated with the processing; obtain spatial metadata associated with the at least two audio signals for rendering at least one of the at least two audio signals; and process at least one of the at least two processed audio signals to be rendered, the processing of the at least one of the at least two processed audio signals to be rendered is based on the spatial metadata and the processing indicator.

The apparatus caused to process at least one of the at least two audio signals to be rendered may be caused to: generate at least two processed audio signals to be rendered based on the spatial metadata; generate at least two decorrelated audio signals based on the at least two processed audio signals; and control a mix of the at least two processed audio signals and the at least two decorrelated audio signals to generate at least two audio signals to be output based on the means configured to process the at least one of the at least two audio signals based on the at least one processing indicator associated with the processing.

The apparatus caused to process at least one of the at least two audio signals to be rendered may be caused to: modify the spatial metadata based on the at least one processing indicator associated with the processing; and generate at least two processed audio signals to be rendered based on the modified spatial metadata.

The apparatus caused to process the at least one of the at least two audio signals to be rendered is caused to: generate at least two beamformers; apply the at least two beamformers to the at least two audio signals to generate beamformed versions of the at least two audio signals; select one of the at least two beamformed versions of the at least two audio signals based the on at least one processing indicator associated with the processing.

The noise may be at least one of: wind noise; mechanical component noise; electrical component noise; device handling noise; and noise that is substantially incoherent between the microphones.

According to a seventh aspect there is provided an apparatus comprising: obtaining circuitry configured to obtain at least two audio signals from at least two microphones, wherein the at least two audio signals at least in part comprise noise which is substantially incoherent between the at least two audio signals; estimating circuitry configured to estimate values associated with the noise within the at least two audio signals; processing circuitry configured to process at least one of the at least two audio signals based on the values associated with the noise; and obtaining circuitry configured to obtain spatial metadata associated with the at least two audio signals for rendering at least one of the at least two audio signals.

According to an eighth aspect there is provided an apparatus comprising: obtaining circuitry configured to obtain at least two processed audio signals, wherein the at least two processed audio signals have been processed from at least two audio signals from at least two microphones, and the at least two processed audio signals have been processed based on in part values associated with noise which is substantially incoherent between the at least two audio signals; obtaining circuitry configured to obtain at least one processing indicator associated with the processing; obtaining circuitry configured to obtain spatial metadata associated with the at least two audio signals for rendering at least one of the at least two audio signals; and processing circuitry configured to process at least one of the at least two processed audio signals to be rendered, the processing comprising processing the at least one of the at least two processed audio signals to be rendered based on the spatial metadata and the processing indicator.

According to a ninth aspect there is provided a computer program comprising instructions [or a computer readable medium comprising program instructions] for causing an apparatus to perform at least the following: obtaining at least two audio signals from at least two microphones, wherein the at least two audio signals at least in part comprise noise which is substantially incoherent between the at least two audio signals; estimating values associated with the noise within the at least two audio signals; processing at least one of the at least two audio signals based on the values associated with the noise; and obtaining spatial metadata associated with the at least two audio signals for rendering at least one of the at least two audio signals.

According to a tenth aspect there is provided a computer program comprising instructions [or a computer readable medium comprising program instructions] for causing an apparatus to perform at least the following: obtaining at least two processed audio signals, wherein the at least two processed audio signals have been processed from at least two audio signals from at least two microphones, and the at least two processed audio signals have been processed based on in part values associated with noise which is substantially incoherent between the at least two audio signals; obtaining at least one processing indicator associated with the processing; obtaining spatial metadata associated with the at least two audio signals for rendering at least one of the at least two audio signals; and processing at least one of the at least two processed audio signals to be rendered, the processing the at least one of the at least two processed audio signals to be rendered based on the spatial metadata and the processing indicator.

According to an eleventh aspect there is provided a non-transitory computer readable medium comprising program instructions for causing an apparatus to perform at least the following: obtaining at least two audio signals from at least two microphones, wherein the at least two audio signals at least in part comprise noise which is substantially incoherent between the at least two audio signals; estimating values associated with the noise within the at least two audio signals; processing at least one of the at least two audio signals based on the values associated with the noise; and obtaining spatial metadata associated with the at least two audio signals for rendering at least one of the at least two audio signals.

According to a twelfth aspect there is provided a non-transitory computer readable medium comprising program instructions for causing an apparatus to perform at least the following: obtaining at least two processed audio signals, wherein the at least two processed audio signals have been processed from at least two audio signals from at least two microphones, and the at least two processed audio signals have been processed based on in part values associated with noise which is substantially incoherent between the at least two audio signals; obtaining at least one processing indicator associated with the processing; obtaining spatial metadata associated with the at least two audio signals for rendering at least one of the at least two audio signals; and processing at least one of the at least two processed audio signals to be rendered, the processing the at least one of the at least two processed audio signals to be rendered based on the spatial metadata and the processing indicator.

According to a thirteenth aspect there is provided an apparatus comprising: means for obtaining at least two audio signals from at least two microphones, wherein the at least two audio signals at least in part comprise noise which is substantially incoherent between the at least two audio signals; means for estimating values associated with the noise within the at least two audio signals; means for processing at least one of the at least two audio signals based on the values associated with the noise; and means for obtaining spatial metadata associated with the at least two audio signals for rendering at least one of the at least two audio signals.

According to a fourteenth aspect there is provided an apparatus comprising: means for obtaining at least two processed audio signals, wherein the at least two processed audio signals have been processed from at least two audio signals from at least two microphones, and the at least two processed audio signals have been processed based on in part values associated with noise which is substantially incoherent between the at least two audio signals; means for obtaining at least one processing indicator associated with the processing; means for obtaining spatial metadata associated with the at least two audio signals for rendering at least one of the at least two audio signals; and means for processing at least one of the at least two processed audio signals to be rendered, wherein the processing the at least one of the at least two processed audio signals to be rendered is based on the spatial metadata and the processing indicator.

According to a fifteenth aspect there is provided a computer readable medium comprising program instructions for causing an apparatus to perform at least the following: obtaining at least two audio signals from at least two microphones, wherein the at least two audio signals at least in part comprise noise which is substantially incoherent between the at least two audio signals; estimating values associated with the noise within the at least two audio signals; processing at least one of the at least two audio signals based on the values associated with the noise; and obtaining spatial metadata associated with the at least two audio signals for rendering at least one of the at least two audio signals.

According to a sixteenth aspect there is provided a computer readable medium comprising program instructions for causing an apparatus to perform at least the following: obtaining at least two processed audio signals, wherein the at least two processed audio signals have been processed from at least two audio signals from at least two microphones, and the at least two processed audio signals have been processed based on in part values associated with noise which is substantially incoherent between the at least two audio signals; obtaining at least one processing indicator associated with the processing; obtaining spatial metadata associated with the at least two audio signals for rendering at least one of the at least two audio signals; and processing at least one of the at least two processed audio signals to be rendered, the processing the at least one of the at least two processed audio signals to be rendered based on the spatial metadata and the processing indicator.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
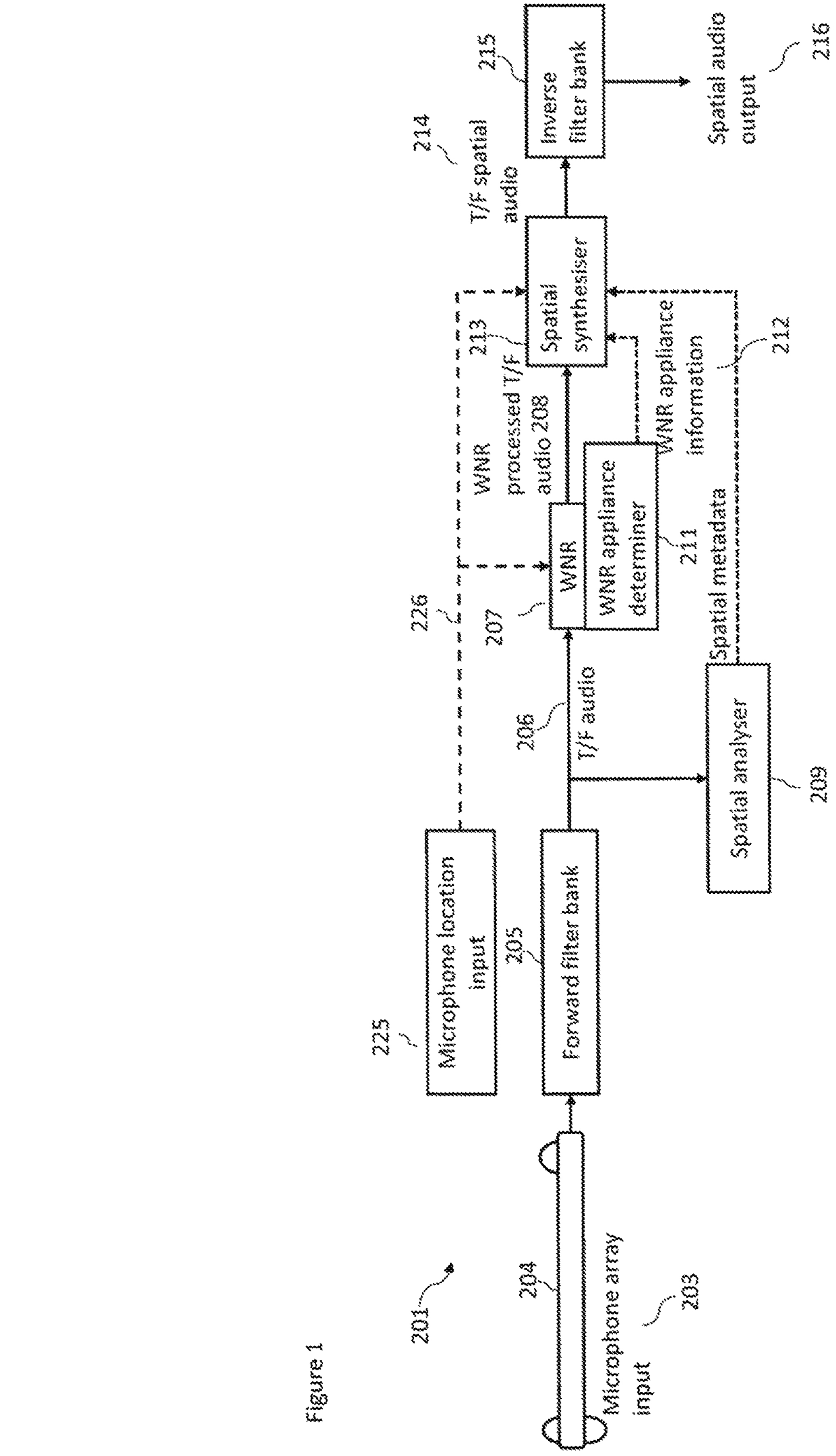
FIG. 1 shows schematically an example encoder/decoder according to some embodiments.

The following describes in further detail suitable apparatus and possible mechanisms for the provision of efficient rendering of spatial metadata assisted audio signals. Although the term spatial metadata is used throughout the following description it may also be known generally as metadata.

As discussed above wind noise is a significant issue in audio capture outdoors, and can reduce the audio quality either in terms of being distractive, or to the point where even speech intelligibility is significantly degraded.

The concept as discussed herein in further detail is to implement wind noise reduction for multi-microphone systems. A system employing multiple microphones has an increased risk that at least one of the microphones has significant captured wind noise as well as an increased probability that at least one microphone audio signal comprises a fair signal quality.

The apparatus and methods as discussed herein provide embodiments which attempt to improve over the output of current methods in the following contexts:

improving the captured audio signals by the application of wind suppression methods;

improving the spatial parameter analysis (e.g. direction determination, sound directionality/ambience determination, etc.).

In other words the apparatus and methods attempt to produce better quality parametric spatial audio capture or audio focus, which would conventionally produce noisy estimated spatial metadata as typically spatial analysis detects windy sound as being similar to ambience, and produces a greater fluctuating direction parameter when compared to non-windy conditions.

The embodiments as discussed herein thus attempt to improve on the conventional wind noise processing in context of parametric audio capture where even in an ideal situation where all wind is removed from a signal, the spatial metadata estimated from the microphone signals remains noisy.

As an example of a disadvantageous situation, let us consider a condition where there is one person talking in windy conditions, where wind is removed but the metadata is noisy, the result of the parametric spatial audio capture is that the speech could be reproduced like ambience using decorrelators. Speech quality, on the other hand, is known to degrade rapidly when applying decorrelation, and as such the output has a very poor perceived audio quality.

In another example, considering the one-talker-situation, when the spatial parameters are applied for an audio focus operation, even if the wind could be removed, the direct-to-total energy ratio parameter may indicate that the sound is mostly ambience. The parameter-based audio focus processing may have been configured to attenuate signals that are considered ambient, and as such the processing would reduce the desired speech signal.

Although the following disclosure explicitly focuses on wind noise and wind noise sources other sources of noise than wind which produce a somewhat similar noise, such as the device handling noise, mechanical or electrical component noise can be handled in a similar manner.

The embodiments as disclosed herein relate to improving captured audio quality of devices with at least two microphones in presence of wind noise (and/or other noise that is substantially incoherent between the microphones also at low frequencies) and where the embodiments apply noise processing to the microphone signals for at least for one frequency range. In such embodiments the method may feature:

Estimating energy value(s) related to the noise within the microphone audio signals, and using these energy value(s) to select or weight more the microphone audio signals that have a relatively small amount of noise; and/or Estimating energy value(s) related to the noise within the microphone audio signals, and based on these energy value(s) applying a gain processing to suppress the noise; and/or Combining the microphone audio signals with static or dynamic weights to suppress the noise, as the noise is substantially incoherent between the microphone audio signals, and at low frequencies the external sounds are not substantially incoherent.

In the following embodiments the processing is implemented within the frequency domain. However in some embodiments other domains, such as the time domain may at least partially implemented.

In the following examples energy values related to the noise within the microphone audio signals may be estimated using cross-correlation between signals from microphone pairs at least at low frequencies, since at low frequencies the sounds arriving to the microphones are substantially coherent between the microphones, while the noise that is mitigated in the embodiments is substantially incoherent between the microphones. However, in some embodiments any suitable method for determining an energy estimate or energy value related to the noise can be used. Furthermore, it is understood that the estimated 'energy values' may in some embodiments be any values related to the amount of noise in the audio signals, for example a square root of the aforementioned energy values or any value that contains information related to the proportion of the noise within the audio signals.

In some embodiments the apparatus is a mobile capture device, such as a mobile phone. In such embodiments spatial metadata is estimated from the microphone audio signals, and then a wind-noise processed audio signal is generated based on the microphone audio signals. A synthesis signal processing (based on spatial metadata) stage in such embodiments may comprise an input identifying whether wind noise processing had been applied, and synthesis processing is then altered based on the input. For example, in some embodiments the synthesis processing is configured to reproduce the ambience differently based on whether the wind noise processing had been applied, such that the ambience is reproduced as being coherent when it is indicated that wind noise audio signal processing has been applied instead of the typical approach of reproducing the ambience as incoherent where wind noise audio signals processing has not been applied.

In some embodiments the apparatus comprises a mobile capture device (such as a phone) and a (remote or physically separate) reproduction device. In these embodiments spatial metadata is estimated from the microphone audio signals, and then a wind-noise processed audio signal is generated from the microphone audio signals.

The spatial metadata and the noise-processed audio signals can be encoded for transmission to a (remote) reproduction/decoding device. An example of the applied coding could be any suitable parametric spatial audio coding technique.

The capture device, in some embodiments, is configured to modify the spatial metadata because wind noise reduction processing was performed for the audio signals. For example in some embodiments:

- the spatial metadata is included with information that the ambience should be reproduced as spatially coherent sound (as opposed of being spatially incoherent), thus avoiding decorrelation procedures due to noisy metadata and the resulting quality degradations;
- the direct-to-total energy ratio is increased, and the direction parameters are steered towards the centre front direction (or directly above for example). This would result in a reproduction that is more mono for non-head tracked binaural reproduction;
- the spatial metadata of nearby time-frequency tiles where the wind is known to be less prominent may be utilized to produce spatial metadata for the 'windy' time-frequency tiles.

In some embodiments the "remote reproduction device" may be the capture device. For example, when the audio and metadata are stored to a suitable memory to be later spatially processed to a desired spatial output.

In some embodiments the apparatus comprises a mobile capture device, such as a phone. In these embodiments the microphone audio signals are analysed to determine the spatial metadata estimates and two audio beamforming techniques are applied to the microphone signals. A first beamformer may be for sharp spatial precision, and a second beamformer may use a more robust design for wind (but has a lower spatial precision).

In such an embodiments when it is detected that the sharp beamformer is substantially corrupted by wind, then the system switches to the more robust beamformer. The parameter-based audio attenuation/amplification (in other words the post-filter) that is applied to the beamformer output can then be changed because the wind was detected and it is known that the spatial metadata is likely to be corrupted, and the method reduces the attenuation or amplification of audio signals based on the spatial metadata.

Some embodiments may differ from the above apparatus and approaches since it does not change the parametric audio processing based on wind noise reduction (WNR).

The apparatus in some embodiments comprises a device that has two or more microphones. Furthermore in some embodiments the device estimates spatial parameters (typically at least a direction parameter in frequency bands) from the microphone audio signals.

In some embodiments the device is configured to create an audio signal with two or more channels where noise is less prominent than it is in the original microphone audio signals, where the two or more channels originate substantially from different microphone sub-groups at different positions around the device. As an example, one microphone array sub-group could be at the left end of a phone in a landscape orientation, while another sub-group could be at the right end of the phone in the landscape orientation.

The device may then process an output spatial audio signal based on the created two or more channels and spatial parameters. The advantages of such embodiments may be that having divided the array into sub-groups, the resulting signal is favourable for example for rendering a binaural output signal. For example, the sub-group signals may have a favourable inherent incoherence with respect to each other for such rendering.

With respect to FIG. 1 is shown a schematic view of an example encoder/decoder 201 according to some embodiments.

As shown in FIG. 1 the example encoder/decoder 201 comprises a microphone array input 203 configured to receive the microphone array audio signals 204.

The example encoder/decoder 201 furthermore comprises a forward filter bank 205. The forward filter bank 205 is configured to receive the microphone array audio signals 204 and generate suitable time-frequency audio signals. For example in some embodiments the forward filter bank 205 is a short-time Fourier transform (STFT) or any other suitable filter bank for spatial audio processing, such as the complex-modulated quadrature mirror filter (QMF) bank. The produced time-frequency audio (T/F audio) 206 can be provided to the wind noise reduction (WNR) processor 207 and spatial analyser 209.

The example encoder/decoder 201 furthermore comprises a WNR processor 207. The WNR processor 207 is configured to receive the T/F audio signals 206 and performs a suitable wind noise reduction processing operation to generate WNR processed T/F audio signals 208.

Wind noise is typically most prominent at the low frequencies, which is also a favourable frequency range for estimation of desired signal energy. In particular, at low frequencies the device does not prominently shadow the acoustic energy, and the signal energy arriving to the microphone array can be estimated from the cross-correlation of the microphone pairs.

For example, denoting the microphone signals as $x_m(k,n)$, where m is the microphone index, k is the frequency bin index of the filter bank, and n is the time index. The cross-correlation between a microphone pair a,b is formulated as:

$$c_{ab}(k,n)=E[x_a(k,n)x_b^*(k,n)],$$

where E denotes the expectation operator, and the asterisk (*) denotes the complex conjugate. The expectation operator can in a practical implementation be replaced with a mean operator over a suitable time-frequency interval near the time and frequency indices k,n.

The expectation of the effect of wind (and other incoherent) noises at the cross-correlation estimate is zero, and thus the energy of the non-windy (and non-other-similar-interferences) signal energy can be approximated for example as $$e(k,n)=\min(|c_{ab}(k,n)|),$$

over all microphone pairs a,b. In some embodiments the WNR processor 207, at these low frequencies, equalizes each microphone signal to that target signal by $$x_a'(k,n) = x_a(k,n)\min\left(1, \sqrt{\frac{e(k,n)}{|c_{aa}(k,n)|}}\right),$$

to obtain the wind-processed signal $x_a'(k,n)$.

However this is an example only. Even if the equalization processing would perform perfectly in an energetic sense, the fact remains that the noise is not only about energies, but it also affects the fine spectral/phase structure of a signal. For example, speech is often a tonal signal, which sounds very different to noise, even if the spectrum was the same.

Therefore, in more demanding windy conditions (which happens often in outdoor recording) it could be that for a frequency band, the wind noise is so loud that a suitable wind noise processed result is obtained by copying (with appropriate gains) the one input channel with a determined least wind noise to all channels of the wind-processed output signal. This one channel could be denoted $x_{min}(k,n)$ and determined simply as that channel $x_a(k,n)$ that has the minimum energy. The channel may be different at different frequency bands. The minimum-energy channel can also be energy-normalized as $$x_{min}'(k,n) = x_{min}(k,n)\min\left(1, \sqrt{\frac{e(k,n)}{|E[x_{min}(k,n)x_{min}^*(k,n)]|}}\right).$$

Alternatively, in some embodiments, instead of selecting one channel the WNR processor is configured to combine multiple microphone signals with varying weights so that the energy of the wind noise (or other similar noises) with respect to the external sounds is minimized.

The WNR processor 207 in some embodiments is configured to work in conjunction with a WNR appliance determiner 211. The WNR appliance determiner 211 may be implemented within the WNR processor 207 or may in some embodiments be separate (such as shown in the Figure for clarity). The WNR appliance determiner 211 may be configured to generate appliance information 212, which may, for example, be a value γ between 0 and 1 indicating the amount or strength of the wind-noise processing. As an example where M is the number of microphones. The parameter could be determined for example as $$\gamma(k,n) = 1 - \frac{e(k,n)M}{\sum_{a=1}^{M} E[|x_a(k,n)|^2]},$$

where the resulting value is restricted to the range between 0 and 1. This is an example only and other formulas can be designed to obtain the parameter such as γ(k,n). For instance, in extreme windy conditions the WNR appliance may use a timer to maintain values close to one. The parameter can be applied to control the WNR processing method combining non-WNR-processed audio $x_a(k,n)$, gain-WNR-processed audio $x_a'(k,n)$, and mono-WNR-processed audio $x_{min}'(k,n)$. In the following we omit the indices (k,n) for clarity. The following formula can be determined:

$$x_a^{WNR} = \begin{cases} 2\gamma x_a' + (1-3\gamma)x_a & \text{when } 0 \le \gamma \le 1/3 \\ 3(\gamma - 1/3)x_{min}' + (2-3\gamma)x_a' & \text{when } 1/3 \le \gamma < 2/3 \\ x_{min}' & \text{when } 2/3 \le \gamma \end{cases}$$

In other words, when γ=0, the WNR output is the same as the microphone input $x_a$ (no processing), when γ=⅓ the WNR output is $x_a'$ (conservative gain processing), when γ=⅔ or above the WNR output is $x_{min}'$, which is the most aggressive mono output processing mode. The equation above is just one example, and different interpolations between the modes may be implemented.

The WNR appliance parameter γ 212 is provided to the spatial synthesiser 213. The WNR processor 207 is also configured to output the WNR-processed time-frequency signal $x_a^{WNR}$ 208 to the spatial synthesiser 213. These time-frequency signals may have M channels (i.e., a=1 . . . M), or less than M channels. For example in some embodiments the WNR output is a channel pair corresponding (mostly) to a left-right microphone alignment (when the WNR output is other than mono). This can be provided as the wind processed signals. In some embodiments this can be based on microphone location information 226 which is provided from a microphone location input 225. The microphone location input 225 in some embodiments is known configuration data identifying the relative locations of the microphones on the apparatus.

The example encoder/decoder 201 furthermore comprises a spatial analyser 209. The spatial analyser 209 is configured to receive the non-WNR processed time-frequency microphone audio signals and determine suitable spatial metadata 210 according to any suitable method.

Figure 2:
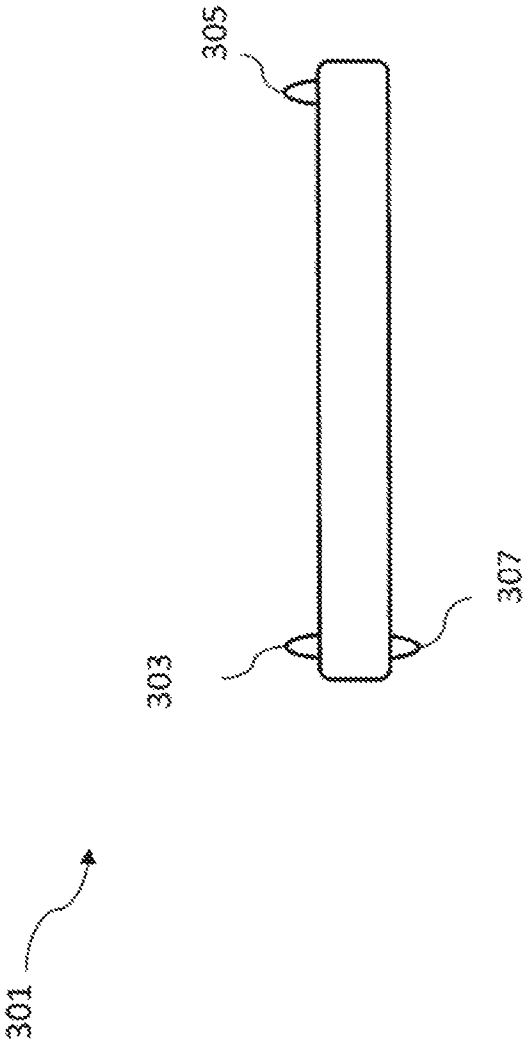
FIG. 2 shows schematically an example microphone position on an apparatus according to some embodiments.

With respect to FIG. 2 is shown an example device or apparatus configuration with example microphone arrangement. The device 301 is shown orientated in landscape orientation and viewed from its edge (or shortest dimension). In this example is shown a first pair of microphones, microphone A 303 and microphone B 305 located on one face (a forward face or side) of the device and a third microphone, microphone C 307 located on a face opposite to the one face (the rear face or side) and opposite microphone A 303.

For such a microphone arrangement the spatial analyser 209 can be configured to first determine, in frequency bands, an azimuth value between −90 and 90 degrees from the delay value that produces the maximum correlation between the microphone pair A-B. Then a correlation analysis at different delays is also performed on microphone pair A-C. However because the distance between A and C is small, the delay analysis is likely to be fairly noisy, and therefore only a binary front-back value is determined from this microphone pair. When a "back" value is observed, the azimuth parameter is mirrored to the rear side or face. For example, an azimuth of 80 degrees is mirrored to azimuth of 100 degrees. By these means a direction parameter is determined for each frequency band. Also, a direct-to-total energy ratio can be determined in frequency bands based on the normalized (between 0 and 1) cross-correlation value between microphone pair A-B. The directions and ratios are then the spatial metadata 210 that is provided to the spatial synthesiser 213.

The spatial analyser 209 thus in some embodiments is configured to determine the spatial metadata, consisting of directions and direct-to-total energy ratios in frequency bands.

The example encoder/decoder 201 furthermore comprises a spatial synthesiser 213. The spatial synthesizer 213 is configured to receive the WNR-processed time-frequency signals 208, the WNR appliance information 212, the microphone location input signal 226, and the spatial metadata 210. The WNR related processing in some embodiments is configured to use known spatial processing methods as the basis of the processing. For example the spatial processing of the received signals may be the following:

1) The time-frequency sound is divided in frequency bands to direct and ambient signals based on the direct-to-total energy ratios in the spatial metadata
2) The direct part is at each band processed with head related transfer functions (HRTFs), Ambisonic panning gains, or vector-base-amplitude panning (VBAP) gains according to the direction parameter in the spatial metadata, depending on the output format
3) The ambient part is processed with decorrelators to the output format. For example, Ambisonic and loudspeaker outputs have the ambience incoherent between the output channels, and binaural output requires the inter-channel correlation to be that according to the binaural diffuse field correlation.
4) The direct and ambient parts are combined to generate a time-frequency spatial output signal.

In some embodiments a more complex but potentially higher quality rendering can be implemented using least-squares optimized mixing to generate the spatial output based on the input signals and the spatial metadata.

The spatial synthesiser 213 can furthermore be configured to utilize the WNR appliance parameter $\gamma$ between 0 and 1. For example the spatial synthesiser 213 can be configured to utilize the WNR appliance parameter in order to avoid excessive spatialization processing and thus to avoid the mono WNR processed sound being completely decorrelated and distributed spatially incoherently. This is because a completely decorrelated mono WNR audio signal may have a reduced perceived quality. Thus for example a simple yet effective way to mitigate the effects of unstable spatial metadata to the spatial synthesis is to reduce the amount of decorrelation at the ambience processing.

In some embodiments the spatial synthesiser 213 is configured to process the audio signals based on the microphone location input information.

The spatial synthesiser 213 is configured to output processed T/F audio signals 214 to an inverse filter bank 215.

The example encoder/decoder 201 furthermore comprises an inverse filter bank 215 configured to receive the processed T/F audio signals 214 and apply the inverse transform corresponding to the applied filter bank 205.

The output of the inverse filter bank 215 is a spatial audio output 216 in a pulse code modulated (PCM) form and which in this example may be a binaural output signal that can be reproduced over headphones.

Figure 3:
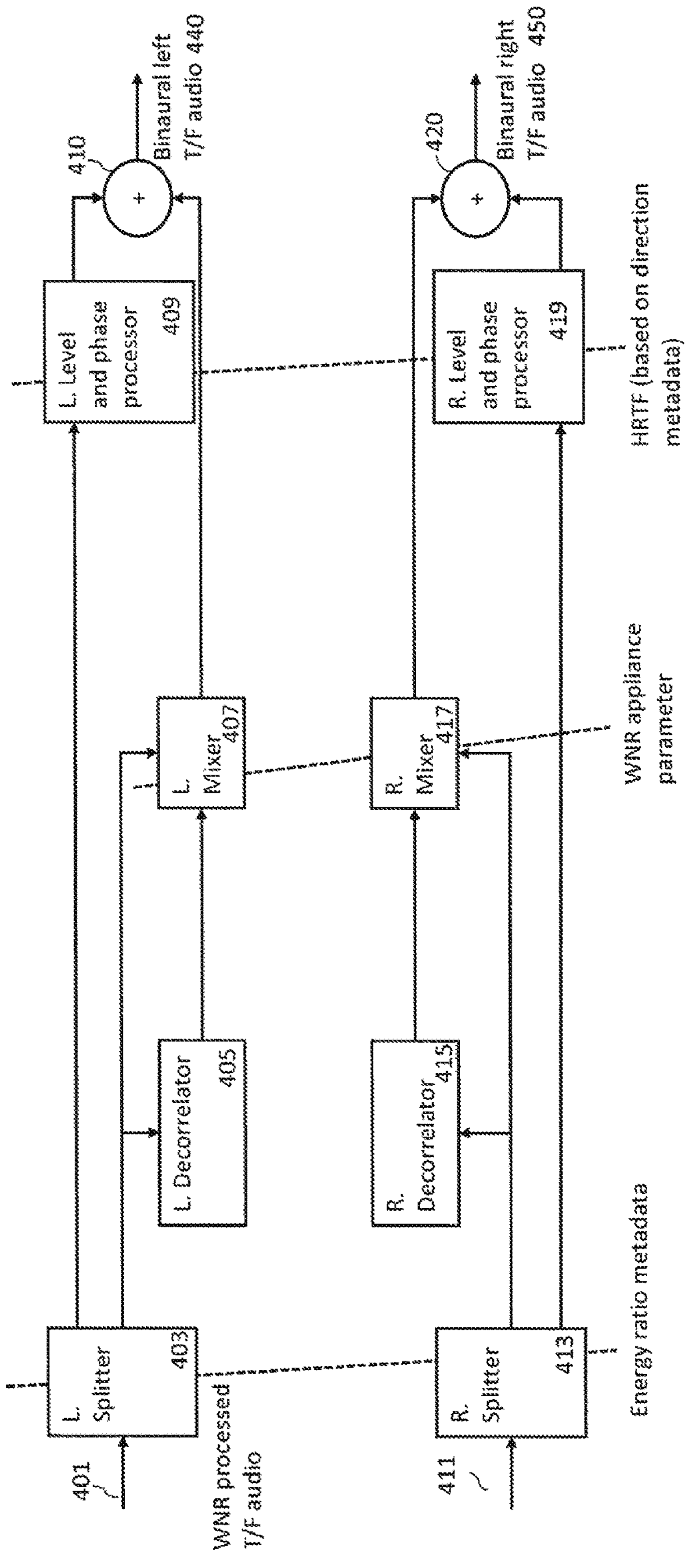
FIG. 3 shows schematically an example spatial synthesiser as shown in FIG. 1 according to some embodiments.

FIG. 3 shows in further detail an example spatial synthesiser 213. In this particular example, only two WNR-processed audio channels are provided as an input (a left input 401, and a right input 411). In some embodiments the spatial synthesiser 213 comprises a pair of splitters (a left splitter 403 and right splitter 413). The WNR-processed audio signal channels are divided by the splitters in frequency bands into direct and ambient components based on the energy ratio parameter.

For example, using a direct-to-total energy ratio parameter r (1 means fully direct, 0 means fully ambience) for a frequency band the direct component can be the audio channels multiplied by $\sqrt{r}$ and ambience component can be the audio channels multiplied by $\sqrt{1-r}$, in frequency bands.

The spatial synthesiser 213 can comprise decorrelators (left decorrelator 405 and right decorrelator 415) which are configured to receive and process the left and right ambient part signals. Since the output is binaural, these decorrelators are designed such that they provide as a function of frequency the inter-channel coherence that is the inter-aural coherence for human listener in a diffuse field.

The spatial synthesiser 213 can comprise mixers (left mixer 407 and right mixer 417) which are configured to receive the decorrelated and the original (or bypassed) signals, which also receives the WNR appliance parameter $\gamma$.

In some embodiments the spatial synthesiser 213 is configured to avoid the situation in particular where a mono-WNR processed audio is being synthesized as ambience by decorrelators. As described previously, in strong wind, the effective WNR generates the mono (or more accurately: coherent) output by selecting/switching/mixing the best possible signal available at the microphones. However, at these situations the spatial metadata typically indicates that the audio is ambience, i.e., r is close to 0. Therefore, majority of the sound energy is the ambience signal. When large values of WNR appliance parameter $\gamma$ are observed, the mixer is configured to utilize the bypass signal instead of the decorrelated signal at the generation of the ambience component. An ambience mix parameter m is thus determined (following the principles of how the earlier WNR processing generated the mono signal)

$$m = \begin{cases} 0 & \text{when } 0 \le \gamma < 1/3 \\ 3(\gamma - 1/3) & \text{when } 1/3 \le \gamma < 2/3 \\ 1 & \text{when } 2/3 \le \gamma \end{cases}$$

Then the "mix" block multiplies the decorrelated signal by $\sqrt{1-m}$ and the bypass signal by $\sqrt{m}$, and sums the results as the output.

The spatial synthesiser 213 may comprise level and phase processor (left level and phase processor 409 and right level and phase processor 419) which are configured to receive the direct components, again in frequency bands and process these based on head-related transfer functions (HRTFs), where HRTFs in turn are selected based on the direction-of-arrival parameter in frequency bands. An example of which is where the level and phase processor is configured to multiply the direct left and right signals in frequency bands by the appropriate HRTFs. A further example may be where the level and phase processor is configured to monitor what the phase and level differences the direct left and right signals already have, and apply phase and energy correction gains, so that the direct part attains the level and phase properties according to the appropriate HRTFs.

The spatial synthesiser 213 further comprises combiners (left combiner 410 and right combiner 420) configured to receive the output of the level and phase processors (the direct component) and the mixers (the ambient component) to generate the binaural left T/F audio signal 440 and binaural right T/F audio signal 450.

Figure 4:
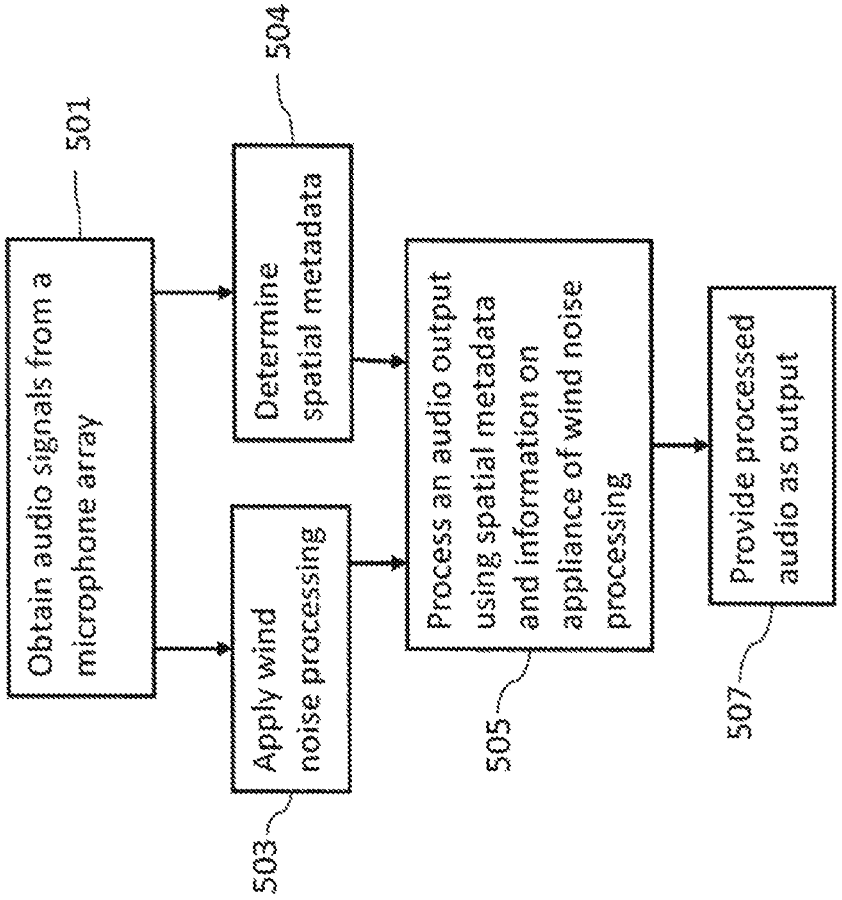
FIG. 4 shows a flow diagram of the operation of the example shown in FIGS. 1 and 3 according to some embodiments.

With respect to FIG. 4 is shown an example flow diagram showing the operations of the apparatus shown in FIGS. 1 and 3.

A first operation is one of obtaining audio signals from a microphone array as shown in FIG. 4 by step 501.

Having obtained audio signals from the microphone array a further operation is one of applying wind noise reduction audio signal processing as shown in FIG. 4 by step 503.

Additionally spatial metadata is determined as shown in FIG. 4 by step 504.

Having applied wind noise reduction audio signal processing and determined the spatial metadata the method may comprise processing an audio output using the spatial metadata and the information on the appliance of the wind noise reduction audio signal processing as shown in FIG. 4 by step 505.

The audio output may then be provided as an output as shown in FIG. 4 by step 507.

A further series of embodiments can be similar to the approaches described in FIG. 1. However in these embodiments the audio is stored/transmitted as a bit stream between encoder processing (where WNR takes place) and decoder processing (where spatial synthesis takes place). The encoder and decoder processing can be on the same or different devices. The storing/transmission may be for example storing to phone memory, or streaming or otherwise transmitting to another device. The storing/transmission may also use a server that obtains the bit stream from the encoder side, and provides it (e.g. at a later time) to the decoder side. The encoding may involve any encoding such as AAC, FLAG or any other codec. In some embodiments encoding is a PCM signal without further encoding.

Figure 5:
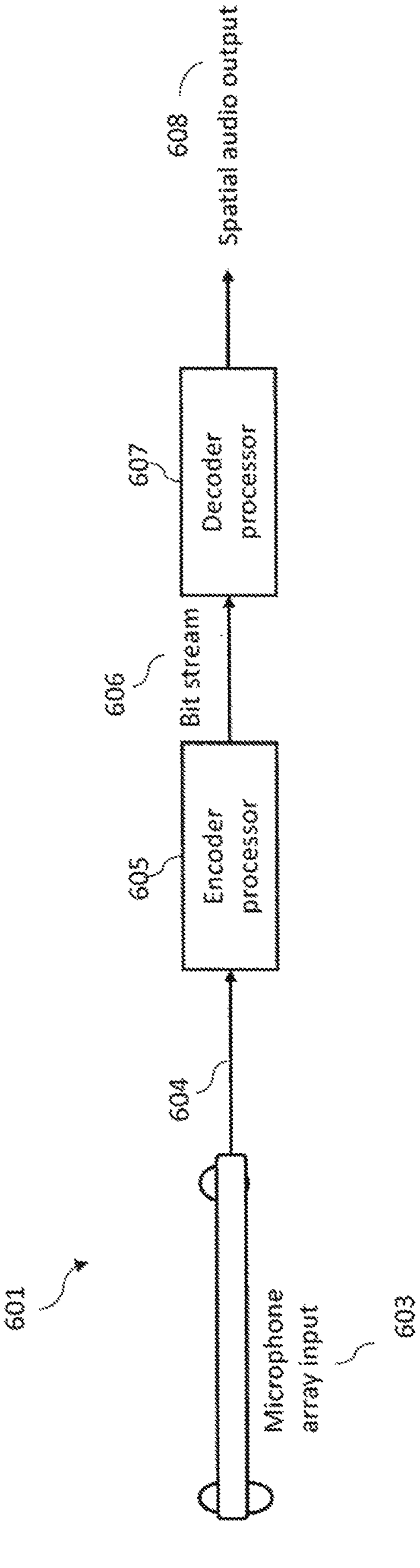
FIG. 5 shows schematically a further example encoder/decoder according to some embodiments.

With respect to FIG. 5 an example system 601 for implementing the further series of embodiments is shown. The system 601 is shown comprising a microphone array 603 configured to receive the microphone array audio signals 604.

The system 601 further comprises an encoder processor 605 (which can be implemented at the capture device), and a decoder processor 607 (which can be implemented at a remote reproduction device). The encoder processor 605 is configured to generate the bit stream 606 based on the microphone array input 604. The bit stream 606 could any suitable parametric spatial audio stream. The bit stream 606 in some embodiments can be related to real-time communication or streaming, or it can be stored as a file to local memory or transmitted as a file to another device. The decoder processor 607 is configured to read the bit stream 606 and produce the spatial audio output 608 (for headphones, loudspeakers, Ambisonics).

Figure 6:
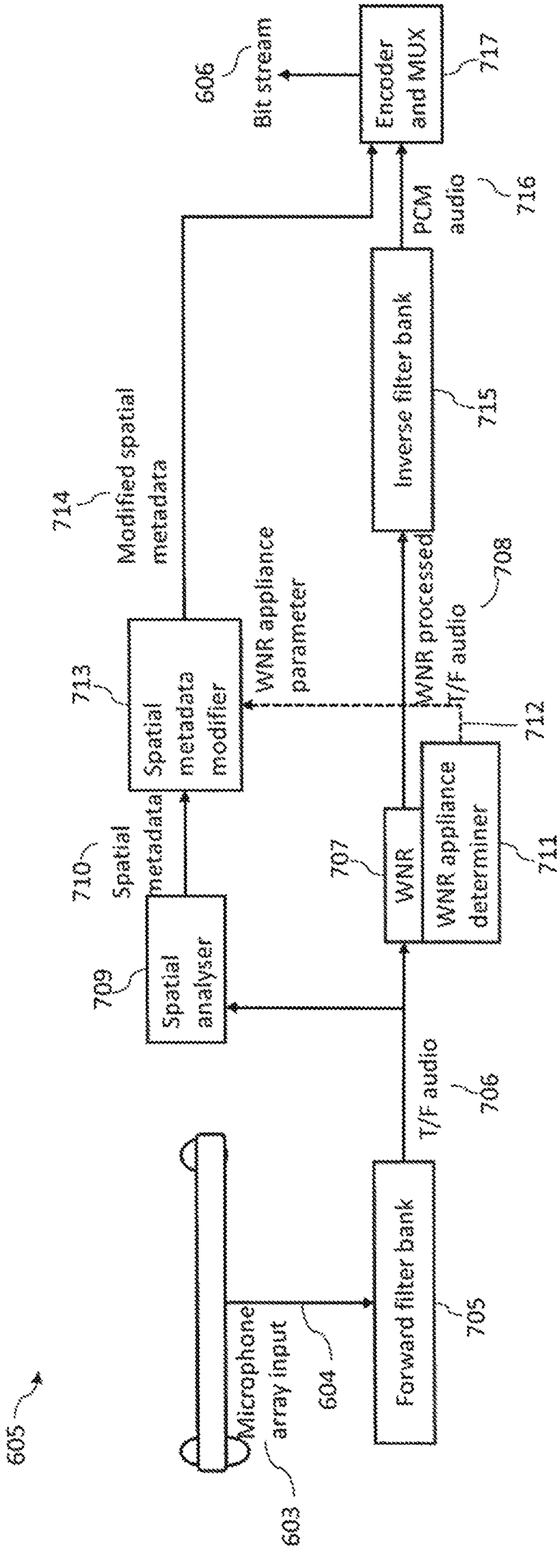
FIG. 6 shows schematically the further example encoder according to some embodiments.

With respect to FIG. 6, an example encoder processor 605 is shown in further detail.

The encoder processor 605 in some embodiments comprises a forward filter bank 705. The forward filter bank 705 is configured to receive the microphone array audio signals 604 and generate suitable time-frequency audio signals 706. For example in some embodiments the forward filter bank 705 is a short-time Fourier transform (STFT) or any other suitable filter bank for spatial audio processing, such as the complex-modulated quadrature mirror filter (QMF) bank. The produced time-frequency audio (T/F audio) 706 can be provided to the wind noise reduction (WNR) processor 707 and spatial analyser 709.

The example encoder processor 605 furthermore comprises a WNR processor 707. The WNR processor 707 may be similar to the WNR processor 207 described with respect to FIG. 1 and configured to receive the T/F audio signals 706 and performs a suitable wind noise reduction processing operation to generate WNR processed T/F audio signals 708 to an inverse filter bank 715.

The WNR processor 707 in some embodiments is configured to work in conjunction with a WNR appliance determiner 711. The WNR appliance determiner 711 may be implemented within the WNR processor 707 or may in some embodiments be separate (such as shown in the Figure for clarity). The WNR appliance determiner 711 may be similar to the example described above.

The WNR appliance parameter γ 712 may be provided to the spatial metadata modifier 713. The WNR processor 707 is also configured to output the WNR-processed time-frequency signal $x_{\alpha}^{WNR}$ 708 to the inverse filter bank 715.

The example encoder processor 605 furthermore comprises a spatial analyser 709. The spatial analyser 709 is configured to receive the non-WNR processed time-frequency microphone audio signals and determine suitable spatial metadata 710 according to any suitable method.

The spatial analyser 709 thus in some embodiments is configured to determine the spatial metadata, consisting of directions and direct-to-total energy ratios in frequency bands to a spatial metadata modifier 713.

The example encoder processor 605 furthermore comprises a spatial metadata modifier 713. The spatial metadata modifier 713 is configured to receive the spatial metadata 710 (which could be directions and direct-to-total energy ratios or other similar D/A ratios) in frequency bands and the WNR appliance information 712. The spatial metadata modifier is configured to adjust the spatial metadata values based on γ, and outputs modified spatial metadata 714.

In some embodiments the spatial metadata modifier 713 is configured to generate a surround coherence parameter (which was introduced in GB patent application 1718341.9, and further elaborated for microphone array input in GB patent application 1805811.5). The parameter is a value between 0 and 1 and indicates if the ambience should be reproduced as spatially incoherent (value 0) or spatially coherent (value 1), or something in between. This parameter can be employed effectively for the present context of WNR. In particular, the spatial metadata modifier 713 can be configured to set the surround coherence parameter at the spatial metadata to be the same as the ambience mix parameter m (which was formulated as a function of γ as discussed above). As the result, in a manner similar to above, this leads to a situation where the ambience should be reproduced coherently when γ is high.

Alternatively, for example when the surround coherence parameter is not available in the particular spatial audio format, the spatial metadata modifier 713 is configured to steer the direction parameters towards the centre, and increase the direct-to-total energy ratio value, when high values of γ were observed.

Figure 7:
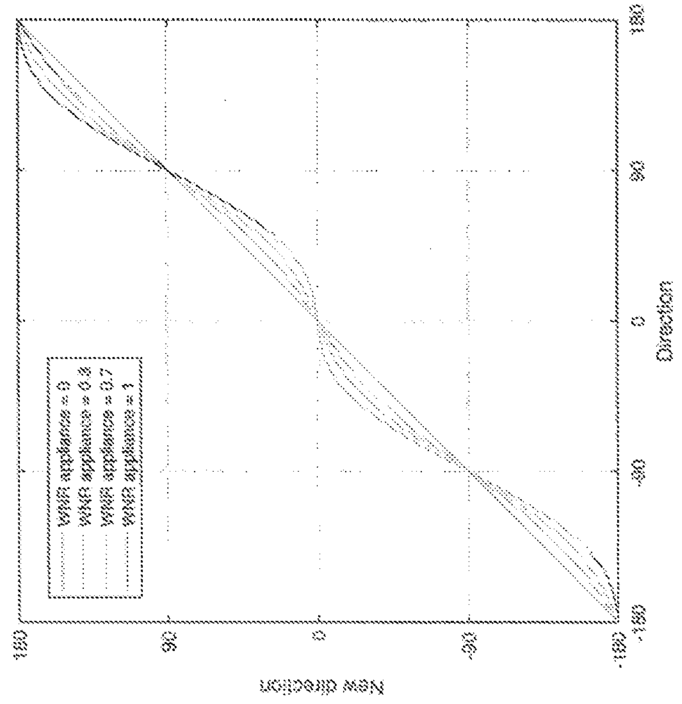
FIG. 7 shows illustrations of the modification of the D/A parameter and direction parameter according to some embodiments.
Figure 7:
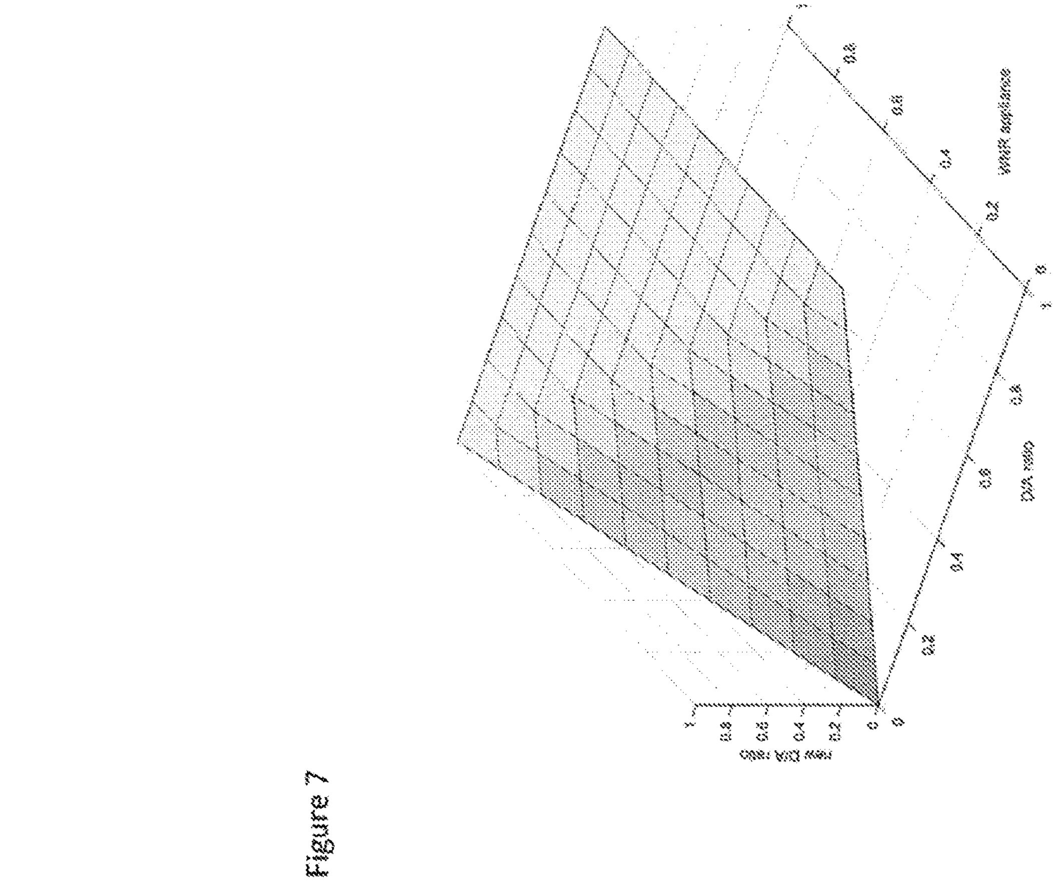

With respect to FIG. 7 is shown example mappings for such a modification. This for binaural reproduction results in a situation where what was supposed to be reproduced as ambience in presence of wind noise is now reproduced as direct sounds near the median plane of the listener, i.e., which is similar to a mono reproduction for binaural headphone playback. Furthermore, steering directions towards centre also stabilizes the effect of fluctuating direction parameters at wind.

The above approach is valid for binaural reproduction, and only when head-tracking is not employed. Alternatively in some embodiments, rather than updating the direction parameters towards the centre front, the spatial metadata modifier 713 is configured to update the direction parameters towards the top elevation direction. In this example even if the head tracking is applied at the final reproduction, as long as the head is rotated only at the yaw axis then the result may be valid.

The encoder processor 605 in some embodiments further comprises an inverse filter bank 715 configured to receive the WNR processed T/F audio signals and apply the inverse transform corresponding to the applied forward filter bank 705.

The output of the inverse filter bank 715 is a PCM audio output 716 which is passed to an encoder/multiplexer 717.

The encoder processor 605 in some embodiments comprises an encoder/multiplexer 717. The encoder/multiplexer 717 is configured to receive the PCM audio output 716 and the modified spatial metadata 714. The encoder/multiplexer 717 encodes the audio signals, for example with AAC or EVS audio codec (depending on the encoder applied) and the modified spatial metadata is embedded to the bit stream with potential encoding. The audio bit stream may be also conveyed in the same media container along with a video stream.

Figure 8:
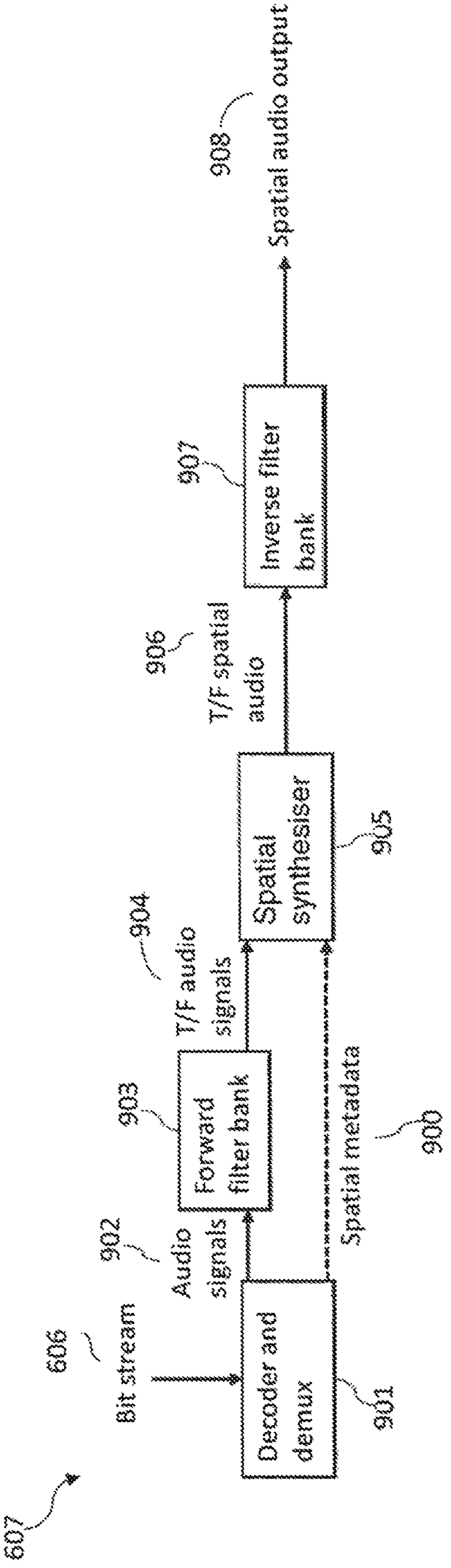
FIG. 8 shows schematically the further example decoder according to some embodiments.

The decoder processor 607 is shown in further detail in FIG. 8. The decoder processor 607 in some embodiments comprises a decoder and demultiplexer 901. The decoder and demultiplexer 901 is configured to retrieve the bit stream 606 and decodes the audio signals 902 and the spatial metadata 900.

The decoder processor 607 may further comprise a forward filter bank 903 which is configured to transform the audio signals 902 into the time-frequency domain and outputs T/F audio signals 904.

The decoder processor 607 may further comprise a spatial synthesiser 905 configured to receive the T/F audio signals 904 and spatial metadata 900 and produces accordingly the spatial audio output in time-frequency domain, the T/F spatial audio signals 906.

The decoder processor 607 may further comprise an inverse filter bank 907, the inverse filter bank 907 transforms the T/F spatial audio signals 906 to the time domain as the spatial audio output 908.

The spatial synthesiser 905 may utilize the described synthesizer as shown in FIG. 3, except that the WNR appliance parameter is not available. In this case,

- if the surround coherence parameter was signalled, it is applied in place of the ambience mixing value m.
- if surround coherence parameter was not signalled, then the alternatively exemplified case was that the direction and ratio values of the metadata were modified. If that is the case, then the processing can be performed as described above but assuming m=0.

Figure 9:
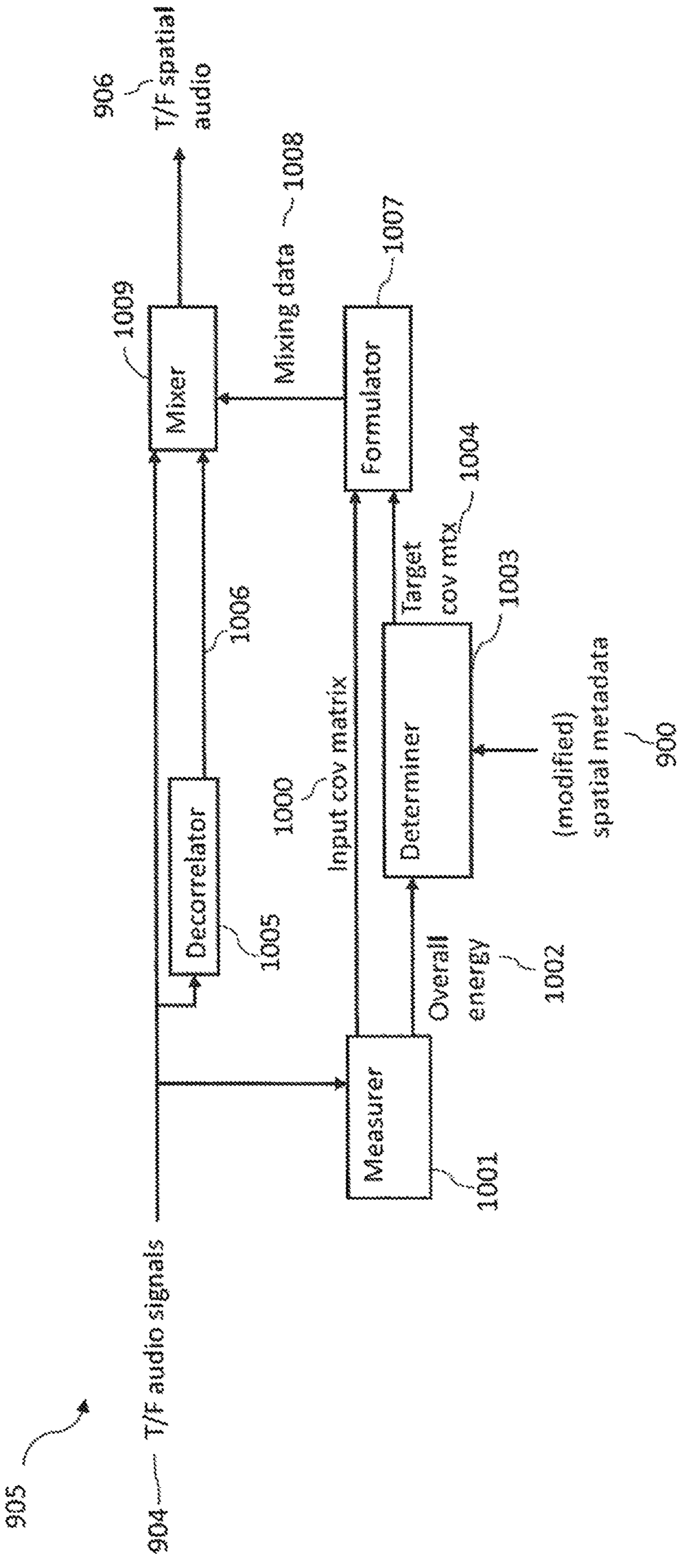
FIG. 9 shows schematically another further example decoder according to some embodiments.

With respect to FIG. 9 is shown a further example spatial synthesiser 905. This further example spatial synthesiser 905 can in some embodiments be used as a replacement for the spatial synthesiser as described earlier. This type of spatial synthesiser was explained in extensive detail in context of GB patent application 1718341.9 that introduced the usage of the surround coherence (and also spread coherence) parameters in spatial audio coding. GB patent application 1718341.9 also described other output modes than binaural, including also surround loudspeaker output and Ambisonics output, which are optional outputs also for the present embodiments.

The spatial synthesiser 905 in some embodiments comprises a measurer 1001 which is configured to receive the input T/F audio signals 904 and measure the input signal covariance matrix (in frequency bands) 1000 and provides it to the formulator 1007. The measurer 1001 is further configured to determine an overall energy value 1002 and pass that to a determiner 1003. This energy estimate can be obtained as the sum of the diagonal of the measured covariance matrix.

The spatial synthesiser 905 in some embodiments comprises a determiner 1003. The determiner 1003 is configured to receive the overall energy estimate 1002 and the (modified) spatial metadata 900 and determine a target covariance matrix 1004 which is output to a formulator 1007. The determiner may be configured to construct a target covariance matrix that is a matrix that determines the energies and cross-correlations for the output signal. For example, the energy value affects the overall energy (diagonal-sum) of the target covariance matrix and the HRTF processing affects the energies and cross-terms between the channels. As a further example, the surround coherence parameter affects the cross-term since it determines if ambience should be reproduced with an inter-channel coherence according to typical ambience or fully coherently. The determiner thus encapsulates the energetic and spatial metadata information in a form of a target covariance matrix and provides it to the formulator 1007.

In some embodiments the spatial synthesiser 905 comprises a formulator 1007. The Formulator 1007 is configured to receive the input covariance matrix 1000 and the target covariance matrix 1004 and determine a least-squares optimized mixing matrix (mixing data) 1008 which can be passed to a mixer 1009.

The spatial synthesiser 905 furthermore comprises a decorrelator 1005 configured to generate a decorrelated version of the T/F audio signals 904 and output the decorrelated T/F audio signals 1006 to the mixer 1009.

The spatial synthesiser 905 may furthermore comprise a mixer 1009 configured to apply the mixing data 1008 to the T/F audio signals 904 and decorrelated T/F audio signals 1006 to generate a T/F spatial audio signal output 906. When there are not enough prominent independent signals at the input to generate that target, also decorrelated signals are mixed to the output.

Figure 10:
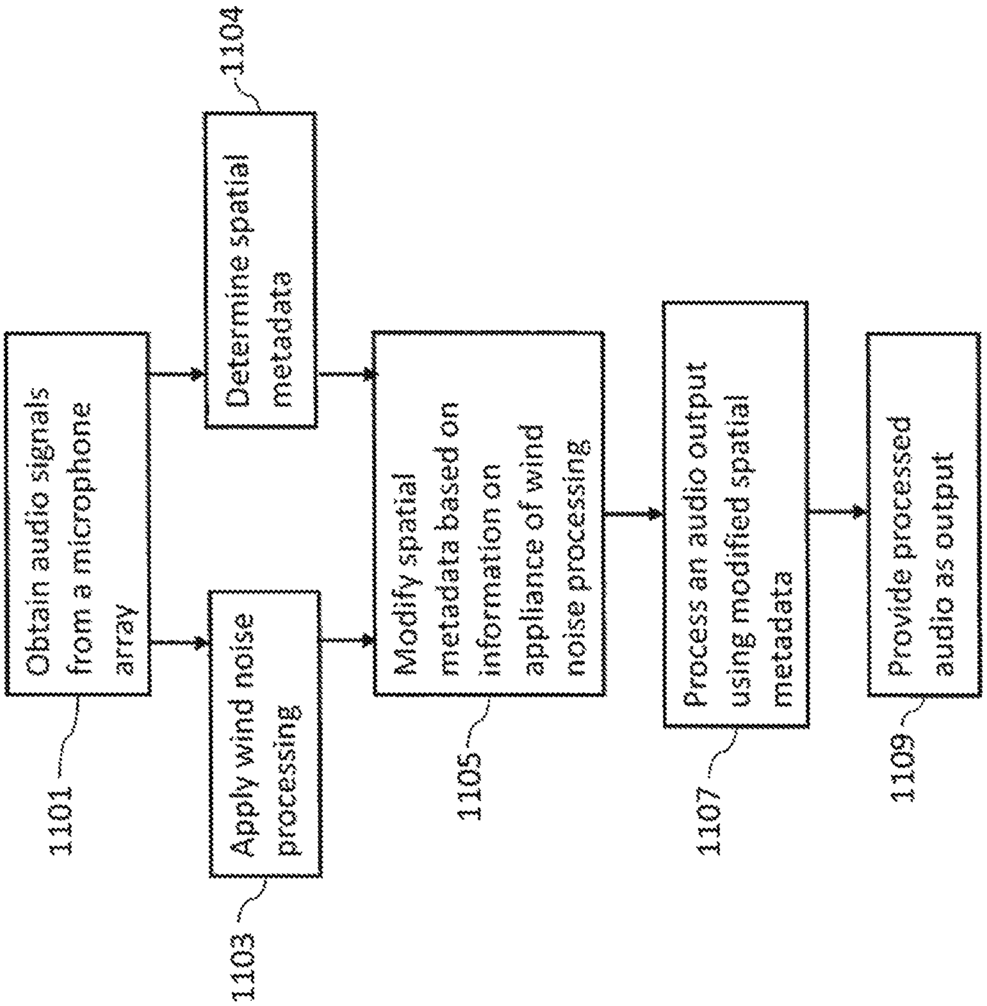
FIG. 10 shows a flow diagram of the operation of the example shown in FIGS. 5 to 9 according to some embodiments.

With respect to FIG. 10 is shown an example flow diagram of the operations according to the further embodiments described herein.

A first operation is one of obtaining audio signals from a microphone array as shown in FIG. 10 by step 1101.

Having obtained audio signals from the microphone array a further operation is one of applying wind noise reduction audio signal processing as shown in FIG. 10 by step 1103.

Additionally spatial metadata is determined as shown in FIG. 10 by step 1104.

Having applied wind noise reduction audio signal processing and determined the spatial metadata the method may comprise modifying spatial metadata based on information on the appliance of wind noise processing as shown in FIG. 10 by step 1105.

The following step is one of processing an audio output using the modified spatial metadata as shown in FIG. 10 by step 1107.

The audio output may then be provided as an output as shown in FIG. 10 by step 1109.

Figure 11:
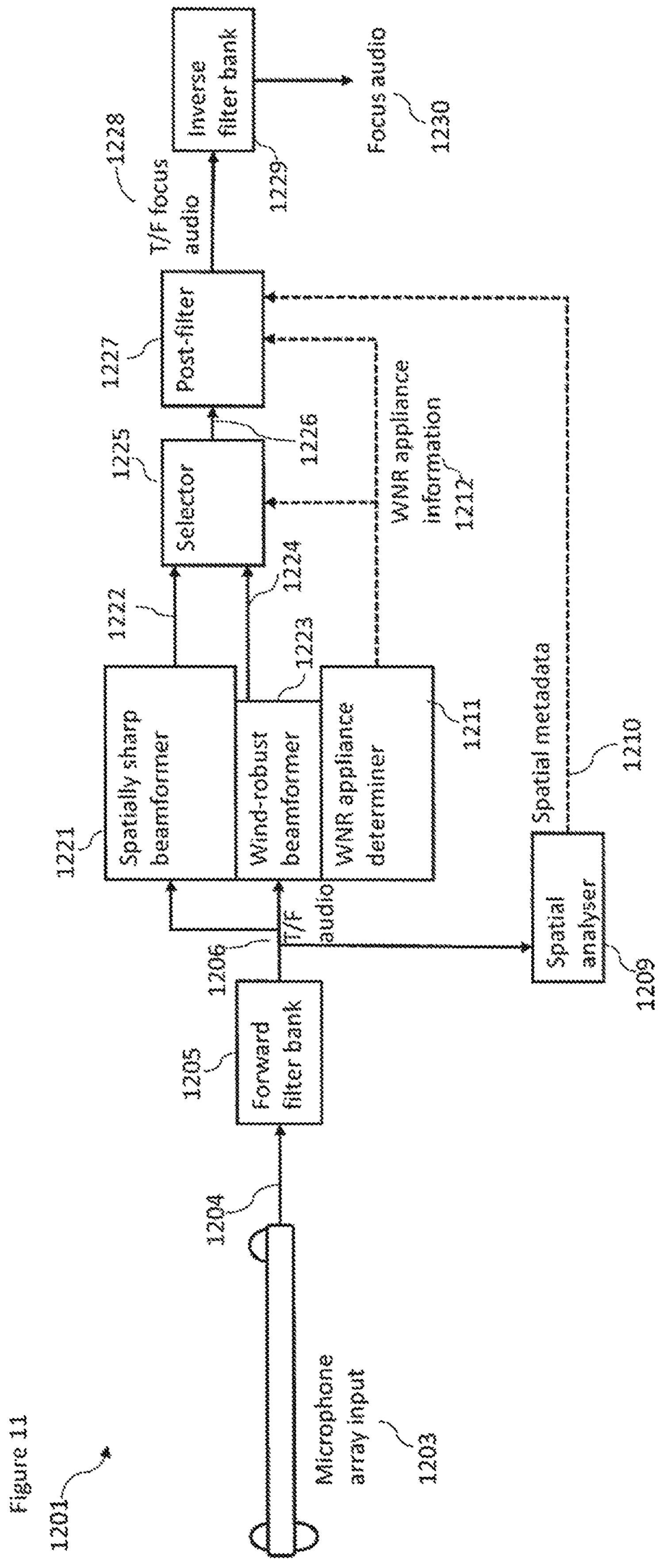
FIG. 11 shows schematically another example encoder/decoder according to some embodiments.

With respect to FIG. 11 is shown some further embodiments. The apparatus 1201 in some embodiments comprises a microphone array input 1203 configured to receive the microphone array audio signals 1204. In this embodiment the parametric processing is implemented to perform audio focus, consisting of 1) beamforming, and 2) post-filtering, which is gain-processing of the beamformed output to further improve the audio focus performance.

The example apparatus 1201 furthermore comprises a forward filter bank 1205. The forward filter bank 1205 is configured to receive the microphone array audio signals 1204 and generate suitable time-frequency audio signals.

The produced time-frequency audio (T/F audio) 1206 can be provided to a spatially sharp beamformer 1221, a wind-robust beamformer 1223 and a spatial analyser 1209.

The example apparatus 1201 may comprise a spatial analyser 1209. The spatial analyser 1209 is configured to receive the time-frequency microphone audio signals 1206 and determine suitable spatial metadata 1210 according to any suitable method.

The time-frequency audio signals are provided to two beamformers, a first beamformer is a spatially sharp beamformer 1221 which is "spatially sharp" and configured to output a spatially sharp beamformed output 1222, and a second beamformer which is a wind-robust beamformer 1223 which is "wind-robust" and configured to output a wind-robust beamformed output 1224. For example, the spatially sharp beamformer 1221 could have been designed such that the external ambience such as reverberation is maximally attenuated. On the other hand, the wind-robust beamformer 1223 could have been designed to maximally attenuate incoherent noise between the microphones. These two beamformers 1221 and 1223 work in conjunction with the WNR appliance determiner 1211. The WNR appliance determiner 1211 is configured to, in frequency bands, determine if the spatially sharp beamformer output 1222 has been excessively corrupted by wind noise, for example, by monitoring if an output energy exceeds a threshold when compared to the mean microphone energy. When it is decided that for a frequency band the spatially sharp beamformer output 1222 has been corrupted by wind noise, then the WNR appliance parameter $\gamma$ 1212 is set to value 1, and otherwise 0. This parameter 1212 can be provided to the selector 1225.

The selector is configured to receive the spatially sharp beamformed output 1222 and wind-robust beamformed output 1224 and the WNR appliance information 1212. The selector is configured to pass through as its output the output of the spatially sharp beamformer 1222 when $\gamma=0$, and the output of the wind-robust beamformer 1224 when $\gamma=1$. The passed-through beamformer signal 1226 is provided to a post-filter 1227. Parameter $\gamma$ and the pass-through selection may be different in different frequency bands.

The post-filter is configured to receive the passed-through beamformer signal 1226 and WNR appliance information 1212 and further attenuate the audio if the direction parameter is above a threshold apart from a determined focus direction and/or if the direct-to-total energy ratio indicates that the audio is mostly non-directional. For example where angle_diff is the angular difference between the focus direction and the direction parameter for a frequency band, the gain-function could be The apparatus 1201 in embodiments further comprises an inverse filter bank 1229 configured to receive the T/F focus audio signal 1228 from the post-filter 1227 and apply the inverse transform corresponding to the applied forward filter bank 1205.

The output of the inverse filter bank 1229 is a focus audio signal 1230.

Figure 12:
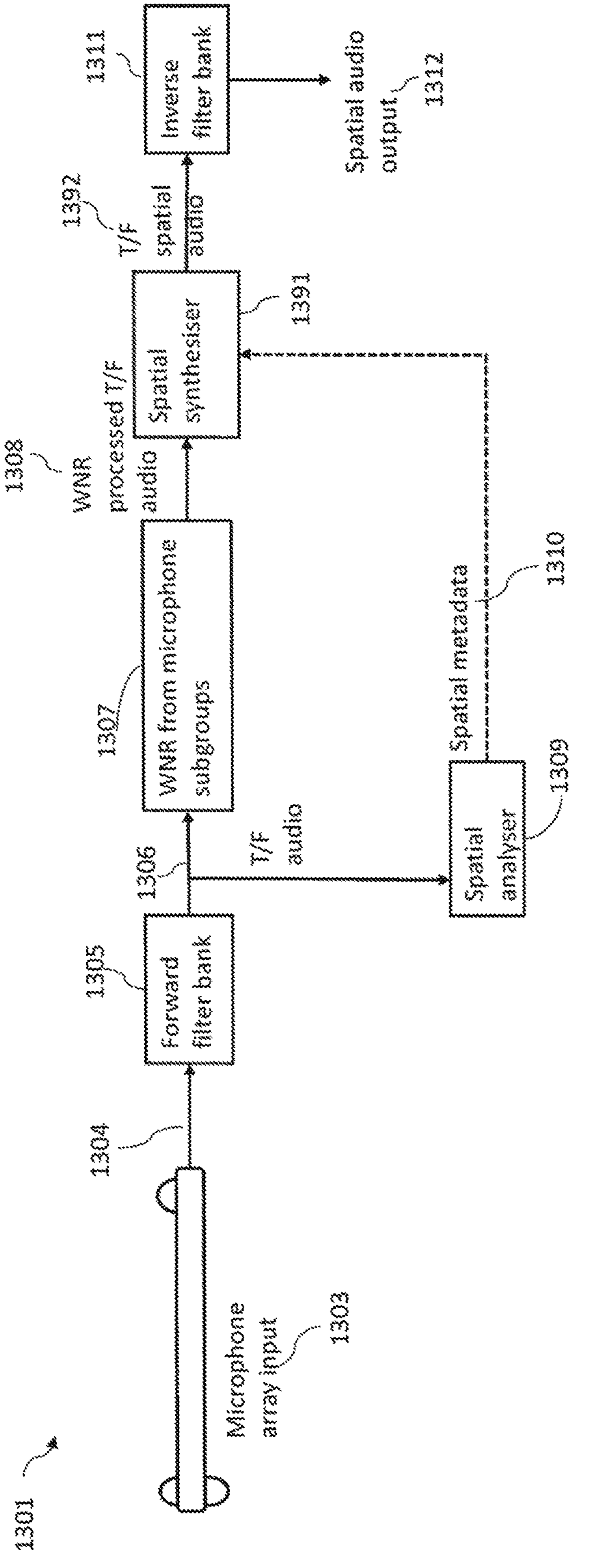
FIG. 12 shows schematically an additional example encoder/decoder according to some embodiments.

A further example embodiment is shown with respect to FIG. 12. The apparatus 1301 in some embodiments comprises a microphone array input 1303 configured to receive the microphone array audio signals 1304.

The example apparatus 1301 furthermore comprises a forward filter bank 1305. The forward filter bank 1305 is configured to receive the microphone array audio signals 1304 and generate suitable time-frequency audio signals. The produced time-frequency audio (T/F audio) 1306 can be provided to a WNR from microphone subgroup processor 1307 and a spatial analyser 1309.

The example apparatus 1301 may comprise a spatial analyser 1309. The spatial analyser 1309 is configured to receive the time-frequency microphone audio signals 1306 and determine suitable spatial metadata 1310 according to any suitable method.

The example apparatus 1301 may comprise a WNR from microphone subgroup processor 1307. The WNR from microphone subgroup processor 1307 is configured to receive the time-frequency audio signals 1306 and generate WNR processed T/F audio signals 1308. The WNR processing is configured such that the processing output has N (typically 2) channels, where each of the WNR outputs originates substantially from a defined microphone subgroup. For example, a mobile phone (for example as shown in the Figures) may have three microphones, two on the left and one on the right. It could be then that the WNR is configured as follows:

- At low frequencies, the target energy for a frequency band e(k,n) is estimated from the cross-correlation of all microphone pairs (as explained in embodiments above)
- A left WNR output is generated by selecting, in frequency bands, the one of the two left microphone signals that has least energy and the result is energy corrected according to e(k,n) (as explained above with respect to the generation of $x_{min}'$)
- A right WNR output is generated by correcting the energy of the one right microphone signal according to e(k,n) (as explained above with respect to the generation of $x_a'$)

The result of the WNR from microphone subgroup processor is a WNR processed stereo signal 1308 that has a favourable left-right spacing for the spatial synthesiser 1391.

$$g'_{focus} = \begin{cases} \max(1/10, \min(1, \ direct\_to\_total\_ratio * 2 - 0.5)) & \text{when } angle\_diff < 30^\circ \\ \max(1/10, \min(1, \ direct\_to\_total\_ratio * 2 - 0.5)/2) & \text{otherwise} \end{cases},$$

However, when the post-filter 1227 receives a parameter $\gamma=1$, then the direction and ratio metadata may be unreliable and the value is overridden as $$g_{focus}=\min(1,g'_{focus}+0.5).$$

When $\gamma=0$ then $g_{focus}=g'_{focus}$.

For each frequency band, the output of the (selected) beamformer is then multiplied by the a corresponding $g_{focus}$, and the result 1228 is provided to the inverse filter bank 1229.

In some embodiments the apparatus 1301 comprises a spatial synthesiser 1391 configured to receive the WNR processed stereo signal 1308 and the spatial metadata 1310. The spatial synthesiser 1391 in this embodiment does not need to know that WNR has been applied, because the WNR processing does not rely on the most aggressive (and effective) methods that produce a mono/coherent WNR output. However in some embodiments the spatial synthesiser 1391 is configured to receive WNR information, and perform any adjustments accordingly, such as moving the direction parameter towards centre and increasing the direct-to-total ratio value, as described in the above embodiments.

In some embodiments left subgroup microphone signals may be combined (e.g. summed) instead of selected to generate the left WNR output. Similarly, combination may be used for other subgroups.

The spatial synthesiser 1391 can implement the spatial synthesis processing methods as described in the embodiments as described above which ensure that the output binaural signal is processed from the (two) channels in a least-squares optimized way. The spatial synthesiser 1391 can be configured to output a T/F spatial audio signal 1392 to an inverse filter bank 1311.

The apparatus 1301 in embodiments further comprises an inverse filter bank 1311 configured to receive the T/F spatial audio signal 1392 from the spatial synthesiser 1391 and apply the inverse transform corresponding to the applied forward filter bank 1305.

The output of the inverse filter bank 1311 is a spatial audio signal 1312.

Figure 13:
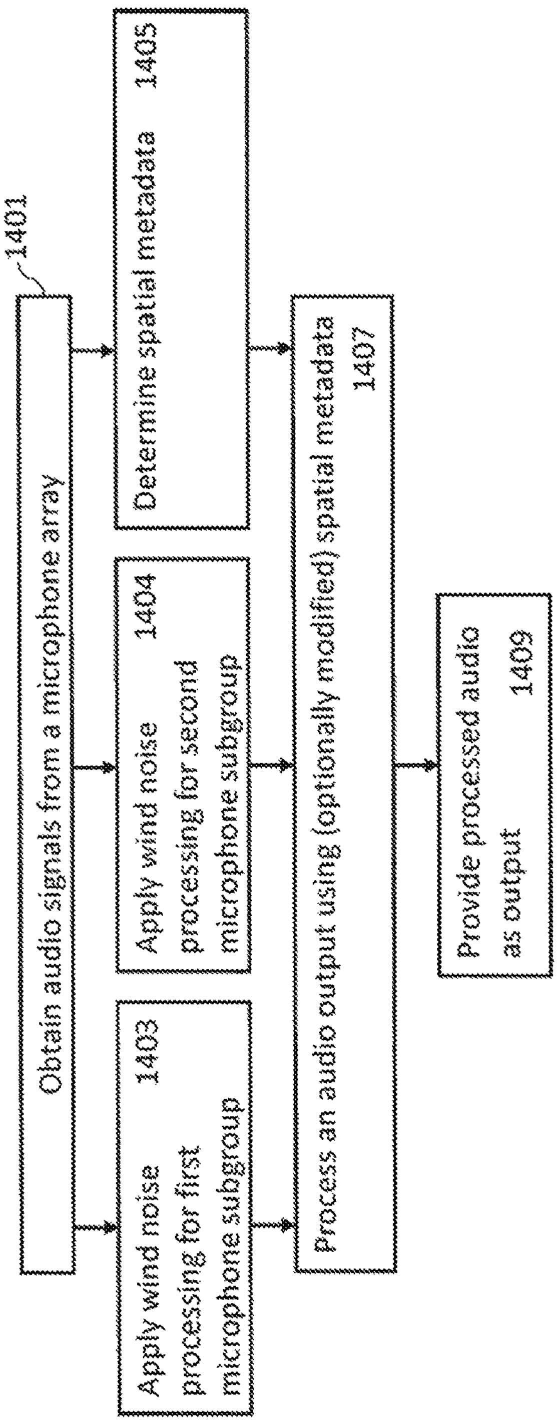
FIG. 13 shows a flow diagram of the operation of the example shown in FIG. 12 according to some embodiments.

With respect to FIG. 13 is shown an example flow diagram of the operations according to the further embodiments described herein.

A first operation is one of obtaining audio signals from a microphone array as shown in FIG. 13 by step 1401.

Having obtained audio signals from the microphone array a further operation is one of applying wind noise reduction audio signal processing for a first microphone subgroup as shown in FIG. 13 by step 1403.

Additionally the method may apply wind noise reduction audio signal processing for a second microphone subgroup as shown in FIG. 13 by step 1404. The microphone subgroups may be overlapping or non-overlapping.

Additionally spatial metadata is determined as shown in FIG. 13 by step 1405.

Having applied wind noise reduction audio signal processing to the first and second microphone subgroups and having determined the spatial metadata the method may comprise modifying spatial metadata and processing an audio output using the modified spatial metadata as shown in FIG. 13 by step 1407.

The audio output may then be provided as an output as shown in FIG. 13 by step 1409.

In the examples shown above the apparatus is shown as a mobile phone with microphones (and a camera). However any suitable apparatus may implement some embodiments such as a digital SLR or compact camera, a head-mounted device (e.g. smart glasses, headphones with microphones), a tablet or a laptop.

Smart phones and many other typical devices with microphones have the processing capabilities to perform the processing according to the embodiments described herein. For example, a software library may be implemented that can be run on the phone and perform the necessary tasks, and that software library can be taken into use by a capture software, playback software, communication software or any other software running on that device. By these means that software, and the device running that software, can obtain the features according to the present invention.

The device with microphones may convey the microphone signals to another device. For example, a device similar to a teleconferencing camera/microphone device may convey the audio signals (along with a video) to a laptop, where the audio processing takes place.

In some embodiments a typical implementation is such where all processing takes place at the mobile phone at the capture time. In this case, all processing steps in these embodiments are running as part of the video (and audio) capture software on the phone. The processed audio is stored to the memory of the phone, usually in an encoded form (e.g. using AAC) along with the video that is captured at the same time. In a typical configuration the audio and video are stored together in a media container, such as an mp4 file, in the phone memory. This file can then be viewed, shared or transmitted as any regular media file.

In some embodiments the audio (along with a video) is streamed at the capture time. The difference is that the encoded audio (and video) output is transmitted during capture. The streamed media may be at the same time also stored to the memory of the device performing the streaming.

Additionally or alternative to the embodiments shown above, the capture software of the mobile phone may store the microphone signals in a raw PCM form to the phone memory. The microphone signals can be accessed at the post-capture time, and the processing according to the embodiments may then be performed by a media viewing/editing software at the phone. For example, at the post-capture time the user may adjust some capture parameters such as focus direction and amount, and the strength of the WNR processing. The processed result is then possibly associated with the video that was captured at the same time as the raw microphone signals.

In some embodiments instead of storing the raw microphone audio signals, another set of data is stored: the wind-processed signals, the information related to the appliance of wind processing and the spatial metadata. For example, in FIG. 1, the output of the WNR processor could be stored in the T/F domain, or converted to time-domain and then stored, and/or encoded with e.g. AAC coding and then stored. The information related to appliance of wind processing and the spatial metadata could be stored as a separate file or embedded along with the wind-processed audio. Then at the post-capture time, the corresponding decoding/demultiplexing/time-frequency transform procedures are applied, and the wind processed audio signals, information related to the appliance of wind processing, and the spatial metadata would be provided to the spatial synthesis procedures. All these procedures are performed by the software in the phone.

In some embodiments the raw audio signals are conveyed to a server/cloud along with the video, where the processing according to the embodiments takes place. Potential user control may take place using a web interface on a third device.

In some embodiments the encoding and decoding devices are different: The processing of the microphone signals to bitstream takes place within the capture software of one mobile phone. The mobile phone streams (or transmits after capture) the encoded bitstream through any available network to a remote device, which may be another mobile phone. The media playback software at this remote mobile phone then performs the processing from the bitstream the PCM output, which is converted to an analog signal and reproduced for example over headphones.

In some embodiments the encoding and decoding devices are the same: All processing takes place within the same device. Instead of streaming or transmitting, the mobile phone stores the bitstream to the memory of the device. Then, at a later stage, the bit stream is accessed by a playback software in the phone being able to read and decode that bit stream.

Examples are shown how the methods can be implemented. However, it is typical in audio signal processing that various processing steps can be combined into unified processing steps, and in some cases the processing steps can be applied in a different order while obtaining similar results. As an example, in some embodiments, the wind processing is performed first to the microphone signals, and then the other processing (based on the spatial metadata) is performed to the resulting wind-processed signal to generate a spatialized output. For example, wind-processing-related gains are applied first to the microphone signals and then HRTF-related complex gains are applied to the resulting signals. However, it is clear that such consecutive gain-processing steps can be combined: These gain sets are multiplied with each other and then applied to the microphone signals. When done so, then effectively both gains are applied to the microphone signals at one unified step. The same applies when signal mixing is performed in any of the steps. Signal mixing can be expressed as matrix operations, and matrix operations can be combined into unified matrix operations by matrix multiplication. Therefore, it is important to understand that the exact order and the division of the system into specific processing blocks may vary from an implementation to another, even if the same or similar processing is performed.

Some embodiments are configured to improve the captured audio quality in presence of wind noise for devices with at least two microphones which apply a parametric audio capture technique. Parametric audio capture, wind processing, and adjusting parametric audio capture based on wind processing may be operations in a well performing capture device. As such the embodiments are improved over devices without parametric capture as such devices are limited to traditional linear audio capture techniques, which for most capture devices provides a narrow and non-spatialized audio image, where parametric capture can provide a wide, natural sounding spatial audio image.

Additionally such embodiments are improved over devices without wind processing capturing audio as on a typical windy day they produce a severely distorted audio quality.

Some embodiments comprise devices which are improved over devices with wind processing and with parametric audio capture, but without adjusting parametric audio capture based on the wind processing as these devices cause the parametric audio processing to be ill-configured due to wind-corrupted parameter estimation. As the result, even if the wind processing is well-performing, several situations occur where the parametric processing due to the corrupted spatial metadata causes a significant drop to the captured audio quality.

Some embodiments succeed in stabilizing the parametric audio capture in presence of wind noise. It is to be noted that the improvement is provided also for other similar noises such as device handling noise (for example from the user's hand, or due to the device being an action or body camera being in touch with the user's clothes or equipment), electronic noise, mechanical noise and microphone noise.

Some embodiments may function both with an independent audio capture device such as a smart phone capturing an audio track for a video, and also with a capture device that uses any suitable audio encoder where the parametric audio rendering occurs at a remote rendering device.

Figure 14:
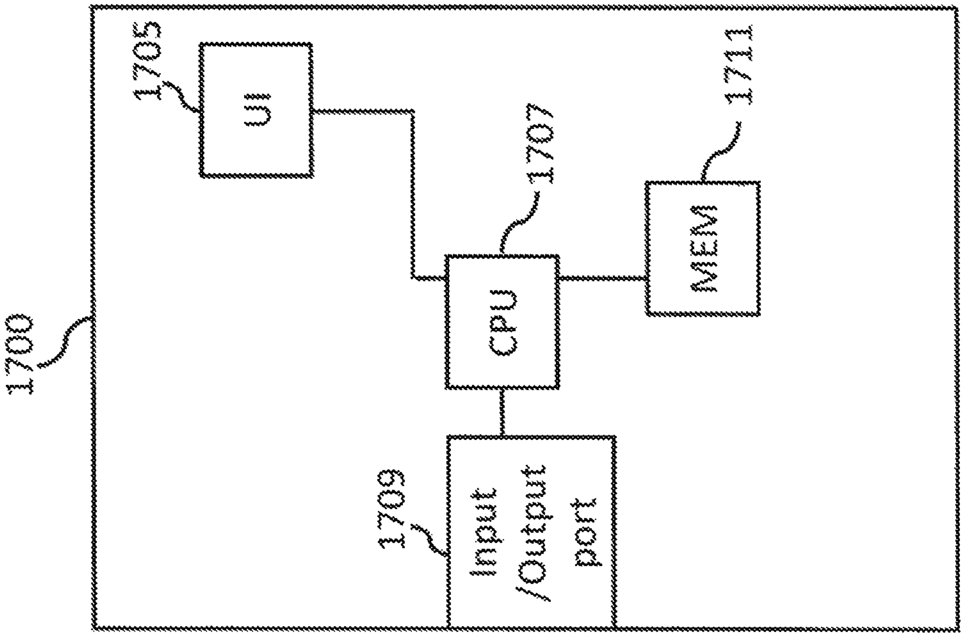
FIG. 14 shows an example device suitable for implementing the apparatus shown.

With respect to FIG. 14 an example electronic device which may be used as the analysis or synthesis device is shown. The device may be any suitable electronics device or apparatus. For example in some embodiments the device 1700 is a mobile device, user equipment, tablet computer, computer, audio playback apparatus, etc.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating with the position determiner as described herein.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals and in some embodiments determine the parameters as described herein by using the processor 1707 executing suitable code. Furthermore the device may generate a suitable transport signal and parameter output to be transmitted to the synthesis device.

In some embodiments the device 1700 may be employed as at least part of the synthesis device. As such the input/output port 1709 may be configured to receive the transport signals and in some embodiments the parameters determined at the capture device or processing device as described herein, and generate a suitable audio signal format output by using the processor 1707 executing suitable code. The input/output port 1709 may be coupled to any suitable audio output for example to a multichannel speaker system and/or headphones (which may be a headtracked or a non-tracked headphones) or similar.

In the examples above the apparatus estimates the energy values associated with the noise. However, in some embodiments other similar parameters or values can be used for the same purpose, and the term "energy value" should be understood broadly. For example, the energy value could be an amplitude value or any value that contains information related to the amount of noise in the microphone audio signals.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory storing instructions that, when executed by the at least one processor, cause the apparatus at least to perform:

obtaining at least two audio signals from at least two microphones, wherein the at least two audio signals at least in part comprise noise which is substantially incoherent between the at least two audio signals;

performing noise reduction processing at least by estimating values associated with the noise within the at least two audio signals and by processing the at least two audio signals based on the estimated values associated with the noise to form at least two noise-processed audio signals;

determining spatial metadata associated with the at least two audio signals, wherein the spatial metadata is determined based on information from the noise reduction processing and at least one of: the at least two noise-processed audio signals; or the at least two audio signals from the at least two microphones; and outputting the at least two noise-processed audio signals and the determined spatial metadata.

2. The apparatus as claimed in claim 1, wherein the processing the at least two audio signals based on the estimated values associated with the noise to form the at least two noise-processed audio signals further comprises:

determining weights to apply to at least one of the at least two audio signals; and applying the weights to the at least one of the at least two audio signals to form the at least two noise-processed audio signals and to suppress the noise.

3. The apparatus as claimed in claim 1, wherein the processing the at least two audio signals based on the estimated values associated with the noise to form the at least two noise-processed audio signals comprises:

generating a weighted combination of a selection of the at least two audio signals based on the values associated with the noise to form the at least two noise-processed audio signals and to suppress the noise.

4. The apparatus as claimed in claim 1, wherein the values associated with the noise comprise at least one of:

energy values associated with the noise;

values based on energy values associated with the noise;

values related to proportions of the noise within the at least two audio signals;

energy values related to noise estimated using cross-correlation between the at least two audio signals;

values related to proportions of non-noise signal components within the at least two audio signals; or values related to energy or amplitude of the non-noise signal components within the at least two audio signals.

5. The apparatus as claimed in claim 1, wherein the noise comprises at least one of:

wind noise;

mechanical component noise;

electrical component noise;

device handling noise; or noise that is substantially incoherent between the at least two microphones.

6. The apparatus as claimed in claim 1, wherein the spatial metadata is determined from the at least two audio signals, and determining the spatial metadata comprises modifying the spatial metadata based on the information from the noise reduction processing.

7. The apparatus as claimed in claim 6, wherein modifying the spatial metadata based on the information from the noise reduction processing comprises modifying the spatial metadata based on a parameter from the noise reduction processing, the parameter having a value between a first value and a second value.

8. The apparatus as claimed in claim 7, wherein:

the first value indicates ambience in the at least two noise-processed audio signals are to be reproduced as spatially incoherent, the second value indicates ambience in the at least two noise-processed audio signals are to be reproduced as spatially coherent, and a value in between the first and second values indicates the at least two noise-processed audio signals are to be reproduced as being in between spatially incoherent and spatially coherent; and the determined spatial metadata comprises an indication of the value of the parameter.

9. The apparatus as claimed in claim 1, wherein the at least one memory further stores instructions that, when executed by the at least one processor, cause the apparatus at least to perform: processing the at least two noise-processed audio signals into a pulse code modulated (PCM) form that is output in the outputting of the at least two noise-processed audio signals.

10. The apparatus as claimed in claim 9, wherein the processing the at least two noise-processed audio signals into the PCM form comprises performing filtering using an inverse filter bank on the at least two noise-processed audio signals to form the PCM form of the at least two noise-processed audio signals.

11. The apparatus as claimed in claim 9, wherein the outputting the at least two noise-processed audio signals and the determined spatial metadata is performed at least by encoding the PCM form of the at least two noise-processed audio signals into a bitstream and by embedding the determined spatial metadata into the bitstream.

12. The apparatus as claimed in claim 11, wherein the outputting also encodes the determined spatial metadata that is embedded into the bitstream.

13. A method comprising:

obtaining at least two audio signals from at least two microphones, wherein the at least two audio signals at least in part comprise noise which is substantially incoherent between the at least two audio signals;

performing noise reduction processing at least by estimating values associated with the noise within the at least two audio signals and by processing the at least two audio signals based on the estimated values associated with the noise to form at least two noise-processed audio signals;

determining spatial metadata associated with the at least two audio signals, wherein the spatial metadata is determined based on based on information from the noise reduction processing and at least one of: the at least two noise-processed audio signals; or the at least two audio signals from the at least two microphones; and outputting the at least two noise-processed audio signals and the determined spatial metadata.

14. The method as claimed in claim 13, wherein the spatial metadata is determined from the at least two audio signals, and determining the spatial metadata comprises modifying the spatial metadata based on the information from the noise reduction processing.

15. The method as claimed in claim 14, wherein modifying the spatial metadata based on the information from the noise reduction processing comprises modifying the spatial metadata based on a parameter from the noise reduction processing, the parameter having a value between a first value and a second value.

16. The method as claimed in claim 15, wherein:

the first value indicates ambience in the at least two noise-processed audio signals are to be reproduced as spatially incoherent, the second value indicates ambience in the at least two noise-processed audio signals are to be reproduced as spatially coherent, and a value in between the first and second values indicates the at least two noise-processed audio signals are to be reproduced as being in between spatially incoherent and spatially coherent; and the determined spatial metadata comprises an indication of the value of the parameter.

17. The method as claimed in claim 13, further comprising: processing the at least two noise-processed audio signals into a pulse code modulated (PCM) form that is output in the outputting of the at least two noise-processed audio signals.

18. The method as claimed in claim 17, wherein the processing the at least two noise-processed audio signals into the PCM form comprises performing filtering using an inverse filter bank on the at least two noise-processed audio signals to form the PCM form of the at least two noise-processed audio signals.

19. The method as claimed in claim 17, wherein the outputting the at least two noise-processed audio signals and the determined spatial metadata is performed at least by encoding the PCM form of the at least two noise-processed audio signals into a bitstream and by embedding the determined spatial metadata into the bitstream.

20. The method as claimed in claim 19, wherein the outputting also encodes the determined spatial metadata that is embedded into the bitstream.

* * * * *